(12) United States Patent
Asano et al.

(10) Patent No.: US 6,933,068 B2
(45) Date of Patent: Aug. 23, 2005

(54) POLYMER ELECTROLYTE MEMBRANE AND SOLID POLYMER ELECTROLYTE FUEL CELL USING SAME

(75) Inventors: Yoichi Asano, Wako (JP); Masaaki Nanaumi, Wako (JP); Nagayuki Kanaoka, Wako (JP); Hiroshi Sohma, Wako (JP); Nobuhiro Saito, Wako (JP); Junji Matsuo, Wako (JP); Kohei Goto, Tsukuba (JP); Masayuki Takahashi, Tsukuba (JP); Yuji Naito, Tsuchiura (JP); Fusazumi Masaka, Tsukuba (JP)

(73) Assignees: Honda Giken Kogyo Kabushiki Kaisha, Tokyo (JP); JSR Corporation, Tokyo (JP)

( * ) Notice: Subject to any disclaimer, the term of this patent is extended or adjusted under 35 U.S.C. 154(b) by 0 days.

(21) Appl. No.: 10/051,199

(22) Filed: Jan. 22, 2002

(65) Prior Publication Data

US 2002/0172850 A1 Nov. 21, 2002

(30) Foreign Application Priority Data

Jan. 19, 2001 (JP) .......................................... 2001-012361
Jan. 19, 2001 (JP) .......................................... 2001-012362
Jan. 19, 2001 (JP) .......................................... 2001-012363
Jan. 19, 2001 (JP) .......................................... 2001-012489

(51) Int. Cl.[7] .......................... H01M 8/10; H01M 10/40
(52) U.S. Cl. ........................ 429/33; 429/46; 429/309; 521/27

(58) Field of Search .................. 429/33, 46, 309, 429/314, 316, 317; 521/27

(56) References Cited

U.S. PATENT DOCUMENTS

| | | | | |
|---|---|---|---|---|
| 5,403,675 | A | * | 4/1995 | Ogata et al. ................... 429/33 |
| 5,795,496 | A | * | 8/1998 | Yen et al. .................... 252/62.2 |
| 6,248,469 | B1 | * | 6/2001 | Formato et al. ............... 429/41 |
| 6,465,136 | B1 | * | 10/2002 | Fenton et al. ............... 429/309 |
| 6,555,626 | B2 | * | 4/2003 | Goto et al. ................. 525/242 |
| 2002/0164513 | A1 | * | 11/2002 | Asano et al. ................. 429/32 |

FOREIGN PATENT DOCUMENTS

| | | |
|---|---|---|
| JP | 06-029032 | 2/1994 |
| JP | 08-259710 | 10/1996 |
| JP | 2000-231928 | 8/2000 |

* cited by examiner

Primary Examiner—Gregg Cantelmo
(74) Attorney, Agent, or Firm—Sughrue Mion, PLLC

(57) ABSTRACT

A composite polymer electrolyte membrane is formed from a first polymer electrolyte comprising a sulfonated polyarytene polymer and a second polymer electrolyte comprising another hydrocarbon polymer electrolyte. In the first polymer electrolyte, 2–70 mol % constitutes an aromatic compound unit with an electron-attractive group in its principal chain, while 30–98 mol % constitutes an aromatic compound unit without an electron-attractive group in its principal chain. The second polymer electrolyte is a sulfonated polyether or sulfonated polysulfide polymer electrolyte.

12 Claims, 3 Drawing Sheets

POLYMER ELECTROLYTE MEMBRANE AND SOLID POLYMER ELECTROLYTE FUEL CELL USING SAME

DETAILED DESCRIPTION OF THE INVENTION

1. Field of the Invention

The present invention relates to a polymer electrolyte membrane and to a solid polymer electrolyte fuel cell using the same.

2. Background of the Invention

The world of today is faced with grave environmental issues: on the one hand oil reserves are becoming exhausted, while on the other the use of fossil fuel leads to global warming. Attention is focused on fuel cells as a clean source of power for electric motors which does not involve the emission of carbon dioxide, and they are currently being widely developed. Indeed, such fuel cells have been put to practical use in certain fields. When it comes to their application in motor cars and the like, solid polymer electrolyte fuel cells employing polymer electrolyte membranes are eminently suitable on account of the ease of acquiring high voltage and current.

Solid polymer electrolyte fuel cells comprise an ion-permeable polymer electrolyte membrane between a pair of electrodes. Compounds of high-molecular perfluoroalkylenesulfonic acids such as Nafion (product name) manufactured by DuPont are widely used in such polymer electrolyte membranes. Compounds of this sort exhibit excellent proton conductivity as a result of sulfonation, while also offering the resistance to chemicals of a fluorine resin. However, an inherent problem is their high cost.

A cheaper alternative to such high-molecular perfluoroalkylenesulfonic acid compounds for use in polymer electrolyte membranes is provided by polyarylene polymers rendered proton-conductive by means of sulfonation.

However, polymer electrolyte membranes of this sort suffer from certain disadvantages, as follows.

To begin with, the first disadvantage of polymer electrolyte membranes formed from sulfonated polyarylene polymers is that adhesion to the electrodes of the solid polymer electrolyte fuel cell is poor.

This tends to result in high contact resistance between the polymer electrolyte membranes formed from sulfonated polyarylene polymers and the electrodes, which makes it difficult to achieve high performance of the fuel cell in generating electricity. Hence it is desirable that a polymer electrolyte membrane with superior properties of adhesion to the electrodes be used in addition to the sulfonated polyarylene polymers.

The second disadvantage is not confined to polymer electrolyte membranes formed from sulfonated polyarylene polymers, and that is the inferior mechanical strength of polymer electrolyte membranes in general.

If too few sulfonic acid groups are introduced during sulfonation, the ion exchange capacity of the polymer electrolyte membrane is low, and it is impossible to achieve satisfactory proton conductivity, resulting in poor performance of the fuel cell in generating electricity. If performance is to be improved, the number of sulfonic acid groups in the polymer electrolyte membrane must be increased and ion exchange capacity enhanced.

However, there is a problem in that enhanced ion exchange capacity is linked to poor mechanical strength, especially resistance to creep. A further problem is that the high degree of repeated distension, expansion and contraction experienced under the conditions of high temperature and high pressure at which a fuel cell operates renders the polymer electrolyte membrane prone to creep deformation.

There has been a variety of proposals aimed at providing a solution to this problem by improving creep deformation and other aspects of mechanical strength in polymer electrolyte membranes formed from high-molecular perfluoroalkylene-sulfonic acid compounds without reducing ion exchange capacity. For instance, Japanese Laid-Open Patent Applications H6[1994]-29032 and H8[1996]-259710 disclose a technique whereby the mechanical strength of a polymer electrolyte membrane is enhanced by impregnating a porous polytetrafluoroethylene (PTFE) stretch-polymer membrane with high-molecular sulfonated fluorine compounds and other ion-exchange resins. Meanwhile, Japanese Laid-Open Patent Application 2000-231928 describes another technique for enhancing the mechanical strength of a polymer electrolyte membrane by adding a polyethylene fiber reinforcement to a perfluorohydrocarbon polymer membrane containing sulfonic acid groups.

However, the PTFE used in the porous membrane and the polyethylene used in the fibers described in the above patent applications are chemically stable polymers which are little prone to dilation, expansion or contraction resulting from changes in temperature and humidity. Accordingly, under conditions of high temperature and high pressure such as those which obtain in an operating fuel cell the polymer electrolyte, being susceptible to dilation, expansion and contraction, becomes detached from the porous membrane or fibers, increasing the resistance of the polymer electrolyte membrane and detracting from the performance of the fuel cell in generating electricity.

The third disadvantage of the polymer electrolyte membrane concerns heat resistance.

The aforesaid membrane electrode assembly with an ion-permeable polymer electrolyte membrane between a pair of electrodes has hitherto been manufactured by positioning the polymer electrolyte membrane between the two electrodes and hot-pressing the polymer electrolyte membrane and electrodes at a temperature in excess of the softening point of the polymer electrolyte membrane. It follows that the membrane electrode assembly is required to be sufficiently heat-resistant not to deteriorate as a result of hot-pressing. What is more, it is required to be sufficiently resilient to withstand operation at high temperatures as demanded in order to increase the output of the fuel cell.

However, membrane electrode assemblys which utilize sulfonated polyarylene polymers and other polymers capable of being manufactured more cheaply than perfluoroalkylenesulfonic acid polymers cannot achieve high performance in generating electricity if they are subjected to high temperatures during hot pressing and while the fuel cell is operating.

SUMMARY OF THE INVENTION

It is an object of the present invention to present a solution to the first disadvantage mentioned above by providing a cheap composite polymer electrolyte membrane which permits of excellent adhesion to the electrodes when employed in a solid polymer electrolyte fuel cell, and a solid polymer electrolyte fuel cell which utilizes the composite polymer electrolyte membrane.

It is a further object of the present invention to present a solution to the second disadvantage mentioned above by providing a composite polymer electrolyte membrane which exhibits excellent mechanical strength when employed in a solid polymer electrolyte fuel cell, and permits of excellent performance in generating electricity irrespective of changes in temperature and humidity, along with a method of manufacturing the composite polymer electrolyte membrane.

It is yet another object of the present invention to present a solution to the third disadvantage mentioned above by providing an membrane electrode assembly which can be manufactured cheaply and exhibits excellent properties of heat resistance, along with a solid polymer electrolyte fuel cell which utilizes the membrane electrode assembly and exhibits excellent performance in generating electricity even under conditions of high temperature.

The authors of the present invention have conducted painstaking research to establish the reason for the first disadvantage, namely why polymer electrolytes formed from sulfonated polyarylene polymers adhere poorly to the electrodes in solid polymer electrolyte fuel cells. They reached the conclusion that it is because the sulfonated polyarylene polymers have a rigid molecular structure and consequently relatively high rigidity. They believe that if a material of this sort is employed in the polymer electrolyte membrane of a solid polymer electrolyte fuel cell, the polymer electrolyte membrane becomes detached from the electrodes by virtue of repeated dilation, expansion and contraction due to the high temperature experienced while the fuel cell is in operation and the low temperature experienced when it is not, the result being poor adhesion.

Examples of rigid molecular structures include phenylene group chains with a plurality of phenylene groups linked with one another at the 1,4 position, 4,4 chains of biphenyl structure, and coaxial bonds of 1,4 chains, 1,5 chains and 2,6 chains of the naphthalene skeleton.

The authors of the present invention have conducted further painstaking research to establish a means of alleviating the rigidity of this linear molecular structure, as a result of which they have discovered that this can be achieved by using a polymer electrolyte formed from a sulfonated polyarylene polymer in combination with another polymer electrolyte.

The first embodiment of the present invention, which is proposed as a solution to the first disadvantage, is a composite polymer electrolyte membrane comprising a mixture of at least two types of polymer electrolyte including a first polymer electrolyte and a second polymer electrolyte, wherein the first polymer electrolyte comprises a sulfonated polyarylene polymer, while the second polymer electrolyte comprises a sulfonated hydrocarbon polymer other than a sulfonated polyarylene polymer.

The composite polymer electrolyte membrane to which the first embodiment of the present invention pertains makes it possible to achieve excellent adhesion with the electrodes when used in a solid polymer electrolyte fuel cell. Polyarylene polymers are inexpensive, and the composite polymer electrolyte membrane can be manufactured more cheaply than electrolyte membranes comprising perfluoroalkylenesulfonic acid type high-molecular compounds.

It is preferable for the composite polymer electrolyte membrane to be such that the first polymer electrolyte constitutes 50–95 wt % of the whole membrane. If the first polymer electrolyte constitutes more than 95 wt % of the whole membrane, adhesion to the electrodes may prove unsatisfactory. If on the other hand it constitutes less than 50 wt % of the whole, ion conductivity may be insufficient, as may also thermal and chemical stability.

In order to achieve even better adhesion with the electrodes, the composite polymer electrolyte membrane has a first polymer electrolyte which comprises a sulfonated polyarylene polymer whereof 2–70 mol % comprises an aromatic compound unit with an electron-attractive group in its principal chain, and 30–98 mol % comprises an aromatic compound unit without an electron-attractive group in its principal chain.

The inclusion of an aromatic compound unit with an electron-attractive group in its principal chain within the first polymer electrolyte imparts flexibility to the rigid molecular structure, alleviating its rigidity. As a result, it is possible to achieve even greater adhesion of the composite polymer electrolyte membrane to the electrodes of the solid polymer electrolyte fuel cell.

On the other hand, when it comes to sulfonating the polyarylene polymer, an aromatic compound unit with an electron-attractive group in its principal chain does not undergo any sulfonation reaction, which occurs only in an aromatic compound unit without an electron-attractive group in its principal chain. The fact that in the composite polymer electrolyte membrane to which the present invention pertains the first polymer electrolyte includes aromatic compound units both with and without electron-attractive groups in their principal chains, each within the aforesaid range, makes it possible to achieve the desired flexibility while retaining the rate of sulfonation required to ensure the desired proton conductivity.

Should the aromatic compound unit with an electron-attractive group in its principal chain constitute less than 2 mol % of the first polymer electrolyte, and the aromatic compound unit without an electron-attractive group in its principal chain more than 98 mol %, it may prove impossible to impart flexibility to the first polymer electrolyte, which means that the composite electrolyte membrane may not achieve a satisfactory degree of adhesion to the electrodes. If on the other hand the aromatic compound unit with an electron-attractive group in its principal chain constitutes more than 70 mol % and the aromatic compound unit without an electron-attractive group in its principal chain less than 30 mol %, it may prove impossible to achieve the desired proton conductivity.

The electron-attractive groups are normally groups with Hammett substituent constants of at least 0.06 at the m-position of the phenyl group, and at least 0.01 at the p-position. Examples of electron-attractive groups suitable for imparting flexibility to the first polymer electrolyte include one or more bivalent groups selected from among—$-CO-$, $-CONH-$, $-(CF_2)_p-$ (where p is an integer between 1 and 10), $-C(CF_3)_2-$, $-COO-$, $-SO-$ and $-SO_2-$.

In the composite polymer electrolyte membrane to which the present invention pertains it is desirable that the first polymer electrolyte constitute for 70–95 wt % of the whole membrane. If the first polymer electrolyte constitutes less than 70 wt % of the whole membrane, it may be impossible for the composite polymer electrolyte membrane to achieve satisfactory adhesion to the electrodes. If on the other hand the first polymer electrolyte constitutes more than 95 wt % of the whole membrane, it may prove impossible to achieve the desired proton conductivity.

Sulfonated polyarylene polymers can be synthesized more cheaply by excluding any with a perfluoroalkylene structure. Accordingly, an example of a sulfonated polyarylene polymer which can be employed in the first polymer electrolyte is one whereof 7–35 mol % comprises an aromatic compound unit having the benzophenone-4,4'-diyl structure represented by formula (1) as the aromatic compound unit with an electron-attractive group in its principal chain, and 65–93 mol % comprises an aromatic compound unit having the 4'-phenoxybenzophenone-2,5-diyl structure represented by formula (2) as the aromatic compound unit without an electron-attractive group in its principal chain.

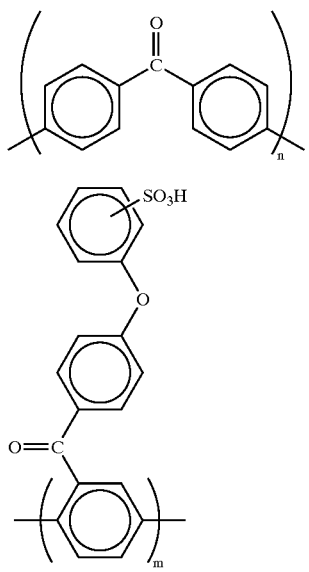

In the aromatic compound unit with the benzophenone-4,4'-diyl structure, the two benzene rings are linked by an electron-attractive —CO— group, and the benzene ring contiguous to the 4,4'-positions contributes to the polymerization reaction, allowing an electron-attractive group to be introduced into the principal chain. In the aromatic compound unit with the 4'-phenoxy-benzophenone-2,5-diyl structure, the benzene ring to which the benzophenone residue is contiguous in the 2,5 positions contributes to the polymerization reaction to form the principal chain, which has no electron-attractive group.

It is desirable that the sulfonated polyarylene polymer has an ion exchange capacity of 1.5–3.0 meq/g. Should the ion exchange capacity of the sulfonated polyarylene polymer be less than 1.5 meq/g, it may prove impossible to achieve the desired proton conductivity. If on the other hand the ion exchange capacity is to be in excess of 3.0 meq/g, it may require the amount of the 4,4'-benzophenone-derived aromatic compound unit with an electron-attractive group in its principal chain to be reduced, making it impossible for the composite electrolyte membrane to achieve satisfactory adhesion to the electrodes.

The first polymer electrolyte may also comprise a sulfonated polyarylene polymer whereof 3–60 mol % comprises an aromatic compound unit having at least one structure wherein the aromatic compounds are ether-bonded as the aromatic compound unit with an electron-attractive group in its principal chain, and 40–97 mol % comprises an aromatic compound unit without an electron-attractive group in its principal chain.

An example of such a sulfonated polyarylene polymer is one whereof 3–60 mol % comprises an aromatic compound unit having the bis(benzoyl)diphenylether-4,4'-diyl structure represented by formula (3) as the aromatic compound unit with an electron-attractive group in its principal chain, and 40–97 mol % comprises an aromatic compound unit having the 4'-phenoxy-benzophenone-2,5-diyl structure represented by formula (2) as the aromatic compound unit without an electron-attractive group in its principal chain.

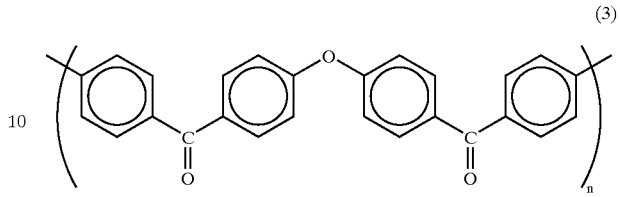

As formula (3) shows, the aromatic compound unit having the bis(benzoyl)diphenylether-4,4'-diyl structure has two electron-attractive benzophenones linked by an ether bond.

It is desirable that the sulfonated polyarylene polymer has an ion exchange capacity of 1.5–3.0 meq/g. Should the ion exchange capacity of the sulfonated polyarylene polymer be less than 1.5 meq/g, it may prove impossible to achieve the desired proton conductivity. If on the other hand the ion exchange capacity is to be in excess of 3.0 meq/g, it may require the amount of the aromatic compound unit of bis(benzoyl)diphenylether-4,4'-diyl structure with an electron-attractive group in its principal chain to be reduced, making it impossible for the composite electrolyte membrane to achieve satisfactory adhesion to the electrodes.

In the composite polymer electrolyte membrane to which the first embodiment of the present invention pertains it is possible to improve adhesion to the electrodes even further by employing in addition to the first polymer electrolyte a second polymer electrolyte which has of itself a flexible molecular structure. Examples include sulfonated polyether polymer electrolytes and sulfonated polysulfide polymer electrolytes. To be more specific, the second polymer electrolyte may be one or more polymer electrolytes selected from among sulfonated polyphenylene oxides, sulfonated polyether ether ketones, sulfonated polyether sulfones and sulfonated polyphenylene sulfides.

Moreover, in the first embodiment of the present invention, a solid polymer electrolyte fuel cell is equipped with a pair of electrodes and an electrolyte membrane held between the two electrodes, the electrolyte membrane being a composite electrolyte membrane. This solid polymer electrolyte fuel cell is capable of achieving excellent performance in generating electricity by virtue of the fact that the composite electrolyte membrane to which the first embodiment of the present invention pertains adheres well to the electrodes.

Next, the second embodiment of the present invention, which is proposed as a solution to the second disadvantage, is a composite polymer electrolyte membrane comprising a mixture of at least two types of polymer electrolyte including a first polymer electrolyte and a second polymer electrolyte, comprising a matrix which comprises a first polymer electrolyte selected from among polyarylene polymer sulfonates and having an ion exchange capacity of at least 1.5 meq/g but less than 3.0 meq/g, and a reinforcement which comprises a second polymer electrolyte selected from among sulfonated polyarylene polymers and having an ion exchange capacity of at least 0.5 meq/g but less than 1.5 meq/g, wherein the matrix being retained by the reinforcement.

In the second embodiment of the composite polymer electrolyte membrane to which the present invention pertains, both the matrix and the reinforcement are selected from among sulfonated polyarylene polymers, the only difference being the ion exchange capacities. The result in chemical terms is that the matrix and reinforcement easily dissolve into each other, while in physical terms they have similar rates of dilation, so that they do not become detached even with repeated dilation, expansion and contraction under conditions of high temperature and high pressure while the fuel cell is in operation.

In the composite polymer electrolyte membrane to which the present invention pertains, a sulfonated polyarylene polymer with an ion exchange capacity suitable for the polymer electrolyte membrane of a solid polymer electrolyte fuel cell is selected as the matrix. Meanwhile, a sulfonated polyarylene polymer with a suitable ion exchange capacity and outstanding mechanical strength is selected as the reinforcement.

Inasmuch as it is to be used as a polymer electrolyte membrane, the sulfonate which constitutes the matrix has an ion exchange capacity of at least 1.5 meq/g but less than 3.0 meq/g, and preferably at least 1.7 meq/g but less than 2.5 meq/g. If the sulfonate which constitutes the matrix has an ion exchange capacity of less than 1.5 meq/g, it is impossible to achieve the proton conductivity required of a polymer electrolyte membrane. If on the other hand it has an ion exchange capacity in excess of 3.0 meq/g, it is impossible to achieve satisfactory mechanical strength even with the use of a reinforcement, or satisfactory durability against high temperatures and humidity.

In order for the sulfonate which constitutes the reinforcement to impart the required mechanical strength to the polymer electrolyte membrane, it has an ion exchange capacity of at least 0.5 meq/g but less than 1.5 meq/g, and preferably at least 0.5 meq/g but less than 1.3 meq/g. If it is less than 0.5 meq/g, this value is lower than that required for proton conductivity in the polymer electrolyte membrane, affinity with the matrix is poor, and it fails to solve the problem of the membrane becoming detached from the electrodes. If on the other hand the ion exchange capacity of the sulfonate constituting the reinforcement is in excess of 1.5 meq/g, it is incapable of imparting the required mechanical strength to the polymer electrolyte membrane.

Both polymer electrolyte membranes are formed from sulfonated polyarylene polymers whereof 5–70 mol % comprises an aromatic compound unit with an electron-attractive group in its principal chain, and 30–95 mol % comprises an aromatic compound unit without an electron-attractive group in its principal chain.

A sulfonation reaction in a polyarylene polymer does not occur in the aromatic compound unit with an electron-attractive group in its principal chain, but only in the aromatic compound unit without an electron-attractive group in its principal chain. Consequently, the amount of sulfonic acid groups introduced into a polyarylene polymer can easily be controlled by adjusting the molar ratio of each aromatic compound unit.

If the proportion of the aromatic compound unit with an electron-attractive group in its principal chain exceeds 70 mol % and that of the aromatic compound unit without an electron-attractive group in its principal chain is less than 30 mol %, too few sulfonic acid groups are introduced into the polyarylene copolymer and it is impossible to ensure that the sulfonated polyarylene copolymer has a satisfactory ion exchange capacity. If on the other hand the proportion of the aromatic compound unit with an electron-attractive group in its principal chain is less than 5 mol % and that of the aromatic compound unit without an electron-attractive group in its principal chain exceeds 95 mol %, an excess of sulfonic acid groups is introduced into the polyarylene copolymer and it is impossible to ensure that the sulfonated polyarylene polymer has sufficient mechanical strength.

The sulfonated polyarylene polymers which form the matrix and reinforcement in the composite polymer electrolyte to which the second embodiment of the present invention pertains may be sulfonates obtained by copolymerizing each aromatic compound unit in differing molar ratios, or they may be produced by sulfonating the same polyarylene polymer under different conditions. Whichever means is adopted, it is possible to obtain sulfonates with ion exchange capacities suitable for the matrix or the reinforcement by adjusting the rate of sulfonation of the polyarylene polymer.

Examples of electron-attractive groups for use in the aromatic compound unit with an electron-attractive group in its principal chain include one or more bivalent electron-attractive groups selected from among —CO—, —CONH—, —(CF$_2$)$_p$—(where p is an integer between 1 and 10), —C(CF$_3$)$_2$—, —COO—, —SO— and —SO$_2$—.

The sulfonated polyarylene polymers which constitute the matrix and reinforcement can be synthesized cheaply and manufacturing costs reduced if sulfonates having a perfluoroalkylene in part of a substitution group or in part of the principal chain structure are excluded.

Examples of sulfonated polyarylene polymers constituting the matrix and reinforcement include those whereof 7–35 mol % comprises an aromatic compound unit having a benzophenone-4,4'-diyl structure of the sort represented by formula (1) as the aromatic compound unit with an electron-attractive group in its principal chain, and 65–93 mol % comprises an aromatic compound unit having a 4'-phenoxy-benzophenone-2,5-diyl structure of the sort represented by formula (2) as the aromatic compound unit without an electron-attractive group in its principal chain.

In order to facilitate their use as matrix and reinforcement, it is desirable that the sulfonated polyarylene polymers have an ion exchange capacity of at least 0.5 meq/g but less than 3.0 meq/g.

The sulfonated polyarylene polymers which form the matrix and reinforcement may also comprise sulfonated polyarylene polymers whereof 3–40 mol % comprises an aromatic compound unit having at least one structure wherein the aromatic compounds are ether-bonded as the aromatic compound unit with an electron-attractive group in its principal chain, and 60–97 mol % comprises an aromatic compound unit without an electron-attractive group in its principal chain. Examples of sulfonates of this sort include such whereof 3–40 mol % comprises an aromatic compound unit having a bis-(benzoyl) diphenylether-4,4'-diyl structure of the sort represented by formula (3) as the aromatic compound unit with an electron-attractive group in its principal chain, and 60–97 mol % comprises an aromatic compound unit having a 4'-phenoxy-benzophenone-2,5-diyl structure of the sort represented by formula (2) as the aromatic compound unit without an electron-attractive group in its principal chain.

For use as the matrix and reinforcement it is desirable that sulfonate polyarylene polymers have an ion exchange capacity of at least 0.5 meq/g but less than 3.0 meq/g.

With a view to making it easier to impart the required mechanical strength to the polymer electrolyte membrane, it is desirable that the sulfonated polyarylene polymer which constitutes the reinforcement be in the form of fibers or a porous film.

The composite polymer electrolyte membrane to which the second embodiment of present invention pertains may advantageously be manufactured by a method which comprises a process of selecting a sulfonate matrix having an ion exchange capacity of at least 1.5 meq/g but less than 3.0 meq/g from among sulfonated polyarylene polymers whereof 5–70 mol % comprises an aromatic compound unit with an electron-attractive group in its principal chain, and 30–95 mol % comprises an aromatic compound unit without an electron-attractive group in its principal chain, and dissolving the matrix in a solvent to produce a uniform matrix solution, a process of selecting a sulfonate reinforcement in the form of fibers having an ion exchange capacity of at least 0.5 meq/g but less than 1.5 meq/g from among sulfonated polyarylene polymers whereof 5–70 mol % comprises an aromatic compound unit with an electron-attractive group in its principal chain, and 30–95 mol % comprises an aromatic compound unit without an electron-attractive group in its principal chain, and dispersing the reinforcement in the matrix solution to produce a uniform slurry, and a process of drying the slurry in sheet form. A sulfonate may be prepared in fiber form by dissolving it in a solvent to produce a uniform reinforcement solution, which can then be spun by the normal method.

Alternatively, the composite polymer electrolyte membrane to which the second embodiment of present invention pertains may advantageously be manufactured by a method which comprises a process of selecting a sulfonate matrix having an ion exchange capacity of at least 1.5 meq/g but less than 3.0 meq/g from among sulfonate polyarylene polymers whereof 5–70 mol % comprises an aromatic compound unit with an electron-attractive group in its principal chain, and 30–95 mol % comprises an aromatic compound unit without an electron-attractive group in its principal chain, and dissolving the matrix in a solvent to produce a uniform matrix solution, a process of selecting a sulfonate reinforcement having an ion exchange capacity of at least 0.5 meq/g but less than 1.5 meq/g from among sulfonate polyarylene polymers whereof 5–70 mol % comprises an aromatic compound unit with an electron-attractive group in its principal chain, and 30–95 mol % comprises an aromatic compound unit without an electron-attractive group in its principal chain, and dissolving the reinforcement in a solvent to produce a uniform reinforcement solution, a process of preparing a reinforcement in the form of a porous film from the reinforcement solution, and a process of impregnating the reinforcement in the form of a porous film with the matrix solution. In order to form the reinforcement solution into a porous film, particles of a layer silicate or similar poorly acid-resistant compound may be added to the reinforcement solution and mixed uniformly, the resultant solution cast in a flat mould and heat-dried to yield a film. This film can then be treated with hydrochloric acid or a similar substance to remove the poorly acid-resistant compound. Alternatively, a foaming agent may be added to the reinforcement solution and mixed uniformly, the resultant solution cast in a flat mould and heat-dried to yield a film. This film can then be foamed by heating while there is a slight residue of organic solvent within it, thus creating a porous structure.

Next, the third embodiment of the present invention, which is proposed as a solution to the third disadvantage, is a solid polymer electrolyte fuel cell equipped with an membrane electrode assembly wherein a pair of electrodes and an electrolyte membrane between the two electrodes are combined so as to form a single entity, wherein the electrolyte membrane comprises a polymer electrolyte membrane comprising a sulfonated polyarylene polymer which in turn comprises an aromatic compound unit with an electron-attractive group in its principal chain, and an aromatic compound unit without an electron-attractive group in its principal chain, the polyarylene polymer being sulfonated in such a manner that, an electrode containing a 0.5 mg/cm$^2$ platinum catalyst being located on one surface of the polymer electrolyte membrane, if the surface of the polymer electrolyte membrane on the side opposite to the electrode is brought into contact with an aqueous solution of sulfuric acid having a pH value of 1 and nitrogen gas is delivered to the electrode in such a manner that the voltage impressed between the aqueous solution of sulfuric acid and the electrode changes continuously from −0.1 to 0.7 volts, the electric charge per unit area represented as a value obtained by dividing the peak area on the proton adsorption side by the area of the membrane electrode assembly is within the range 0.09–0.18 C/cm$^2$.

The polymer electrolyte membrane employed in the third embodiment of the present invention is obtained by sulfonating a polyarylene polymer comprising two aromatic compound units as above. This is achieved by adjusting the structure of the polyarylene polymers along with the amount of sulfonic acid groups introduced into the polyarylene polymers as regulated by their structures. This means that it is possible to ensure that the electric charge per unit area (sometimes referred to below as the 'Q value') measured under these conditions falls within the range 0.09–0.18 C/cm$^2$. The polymer structure of the sulfonate of a Q value within the above range is not to be dissolved even at high temperatures.

In the polymer electrolyte membrane, use of sulfonates from polyarylene polymers such as give a Q value of less than 0.09 C/cm$^2$ means that the amount of sulfonic acid groups introduced into the polyarylene polymers is small, and it is impossible to achieve the desired performance in generating electricity. On the other hand, use of sulfonates from polyarylene polymers such as give a Q value in excess of 0.18 C/cm$^2$ means that the amount of sulfonic acid groups introduced into the polyarylene polymer increases, and the polymer tends to become water-soluble as a result. Even if it does not become water-soluble, it will be problematic in that the sulfonic acid groups will be prone to thermal decomposition, and the temperature at which this occurs will fall. In other words, polymer electrolyte membranes formed from sulfonated polyarylene polymers with a Q value in excess of 0.18 C/cm$^2$ are prone to partial thermal decomposition of the polymer structure if exposed to high temperatures during the manufacturing process or while operating, and the occurrence of pin-holes and other defects make it impossible to achieve the desired performance in generating electricity.

In the above polyarylene polymer, only the aromatic compound unit without an electron-attractive group in its principal chain undergoes sulfonation, and the one with an electron-attractive group in its principal chain does not. Thus, the polymer electrolyte membrane is formed from a sulfonated polyarylene polymer whereof 5–70 mol % comprises an aromatic compound unit with an electron-attractive group in its principal chain, and 30–95 mol % comprises an aromatic compound unit without an electron-attractive group in its principal chain. By adjusting the molar ratio of the two aromatic compound units of the polymer electrolyte membrane within the aforesaid ranges it is possible to control the amount of sulfonic acid groups introduced into the polyarylene polymer, thus easily attaining a Q value within the above range.

By adjusting the molar ratio of the two aromatic compound units which form the polyarylene polymer to within the above range it is possible to ensure that subsequent sulfonation will yield an membrane electrode assembly with a Q value within the aforesaid range. This can also be achieved by taking a polyarylene polymer which has been obtained by adjusting the molar ratio of the two aromatic compound units to within the above range, and in turn adjusting the sulfonation conditions.

If in the polyarylene polymer the proportion of the aromatic compound unit with an electron-attractive group in its principal chain exceeds 70 mol % and that of the aromatic compound unit without an electron-attractive group in its principal chain is less than 30 mol %, too few sulfonic acid groups are able to be introduced and it will be impossible to increase the Q value of the membrane electrode assembly above 0.09 C/cm$^2$. If on the other hand the proportion of the aromatic compound unit with an electron-attractive group in its principal chain is less than 5 mol % and that of the aromatic compound unit without an electron-attractive group in its principal chain exceeds 95 mol %, excessive sulfonic acid groups can be introduced and it will be difficult to keep the Q value of the membrane electrode assembly below 0.18 C/cm$^2$.

The membrane electrode assembly to which the present invention pertains is capable of exhibiting outstanding performance in generating electricity because a polymer electrolyte membrane comprising polyarylene polymers suitably sulfonated as described above forms a single entity with the electrodes.

Examples of electron-attractive groups for use in the aromatic compound unit with an electron-attractive group in its principal chain include one or more bivalent electron-attractive groups selected from among —CO—, —CONH—, —(CF$_2$)$_p$—(where p is an integer between 1 and 10), —C(CF$_3$)$_2$—, —COO—, —SO— and —SO$_2$—.

The sulfonated polyarylene polymers which form the polymer electrolyte membrane can be synthesized cheaply and manufacturing costs reduced if sulfonates having a perfluoroalkylene as a substitution group or in part of the principal chain structure are excluded.

Examples of sulfonated polyarylene polymers forming the polymer electrolyte membrane include those whereof 7–35 mol % comprises an aromatic compound unit having a benzophenone-4,4'-diyl structure of the sort represented by formula (1) as the aromatic compound unit with an electron-attractive group in its principal chain, and 65–93 mol % an aromatic compound unit having a 4'-phenoxy-benzophenone-2,5-diyl structure of the sort represented by formula (2) as the aromatic compound unit without an electron-attractive group in its principal chain.

In order to ensure Q values within the aforesaid range when they are used in a polymer electrolyte membrane, it is desirable that the sulfonated polyarylene polymers have an ion exchange capacity of at least 0.5 meq/g but less than 3.0 meq/g.

The sulfonated polyarylene polymer which constitutes the polymer electrolyte membrane may also comprise sulfonated polyarylene polymer whereof 3–40 mol % comprises an aromatic compound unit having at least one structure wherein the aromatic compounds are ether-bonded as the aromatic compound unit with an electron-attractive group in its principal chain, and 60–97 mol % comprises an aromatic compound unit without an electron-attractive group in its principal chain. Examples of sulfonates of this sort include such whereof 3–40 mol % comprises an aromatic compound unit having a bis-(benzoyl) diphenylether-4,4'-diyl structure of the sort represented by formula (3) as the aromatic compound unit with an electron-attractive group in its principal chain, and 60–97 mol % comprises an aromatic compound unit having a 4'-phenoxy-benzophenone-2,5-diyl structure of the sort represented by formula (2) as the aromatic compound unit without an electron-attractive group in its principal chain.

For use as the polymer electrolyte membrane in the aforesaid membrane electrode assembly it is desirable that sulfonate polyarylene polymers have an ion exchange capacity of at least 0.5 meq/g but less than 3.0 meq/g.

In the third embodiment of the present invention, the solid polymer electrolyte fuel cell has an membrane electrode assembly as described above. By employing an membrane electrode assembly with a Q value in the range 0.09–0.18C/cm$^2$, it is possible to achieve excellent performance in generating electricity.

PREFERRED EMBODIMENTS

To begin with, there follows a description of a first embodiment of the present invention.

Figure 1:
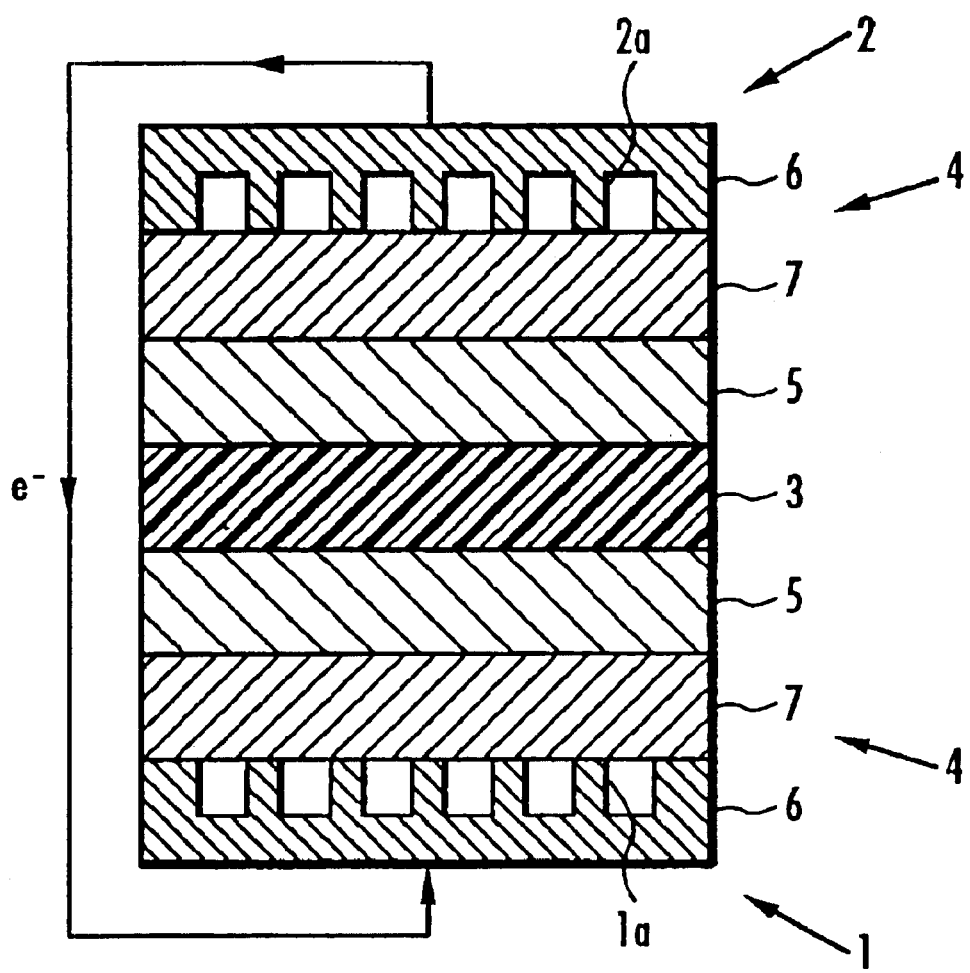
FIG. 1 is an explanatory cross-sectional diagram illustrating one example of the configuration of the membrane electrode assembly employed in the solid polymer electrolyte fuel cell to which the present invention pertains.

In the first embodiment of the present invention the solid polymer electrolyte fuel cell employing a composite polymer electrolyte membrane has an membrane electrode assembly configured as illustrated in FIG. 1. This membrane electrode assembly has an oxygen electrode 1 and a fuel electrode 2, between which is a composite polymer electrolyte membrane 3. The oxygen electrode 1 and fuel electrode 2 each have a gas-diffusion layer 4 and a catalytic layer 5 formed on the gas-diffusion layer 4, and come into contact with the composite polymer electrolyte membrane 3 on the side nearer the membrane layer 5. The gas-diffusion layers 4 consist of carbon paper 6 and an underlayer 7.

In this membrane electrode assembly, the underlayer 7 is formed by coating one side of the carbon paper 6 with a slurry prepared by mixing, for instance, carbon black and polytetrafluoroethylene (PFTE) at a specified ratio by weight, uniformly dispersing them in ethylene glycol or a similar organic solvent, and allowing the dispersion to dry. It should be added that the carbon paper 6 has on the side nearer the underlayer 7 an oxygen passage 1a for delivering air and other gases containing oxygen at the oxygen electrode 1, and a fuel passage 2a for delivering hydrogen and other fuel gases at the fuel electrode 2. The catalytic layer 5 is formed by mixing, for instance, catalyst particles prepared by supporting platinum on carbon black at a specified ratio by weight, mixing to a uniform paste with an ion-conductive binder, coating the underlayer 7 with this paste, and drying.

The membrane electrode assembly is then formed by hot-pressing the composite polymer electrolyte membrane 3 between the catalytic layers 5 of the oxygen electrode 1 and fuel electrode 2.

In the first embodiment of the present invention, the polymer electrolyte membrane 3 is a composite polymer electrolyte membrane comprising a mixture of at least a first polymer electrolyte and a second polymer electrolyte. The first polymer electrolyte is a sulfonated polyarylene polymer, while the second is a hydrocarbon polymer electrolyte other than the sulfonated polyarylene polymer which constitutes the first polymer electrolyte.

The polyarylene polymer includes at least one of the structural units represented by formulas (4) and (5), and may be a monopolymer or a copolymer.

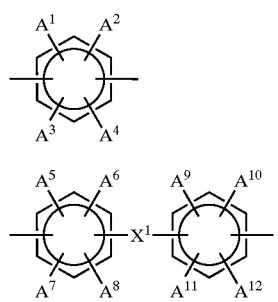

In formula (4) or formula (5), the C of the aromatic ring may be partly replaced with N. $A^1$–$A^{12}$ are selected from a group comprising —F, —CN, —CHO, —COR, —CR=NR', —OR, —SR, —$SO_2$R, —OCOR, —$CO_2$R, —NRR', —N=CRR', —NRCOR', —CONRR' and —R, and may be the same or different. R and R' are one or more selected from among hydrogen, an alkyl group, substituted alkyl group, aryl group, substituted aryl group, heteroaryl group and substituted heteroaryl group, and may be the same or different.

Examples of alkyl or substituted alkyl groups represented by —R include methyl, ethyl, propyl, n-butyl, t-butyl, dodecanyl, trifluoromethyl, perfluoro-n-butyl, 2,2,2-trifluoroethyl, benzyl, and 2-phenoxyethyl. Examples of aryl or substituted aryl groups represented by —R include phenyl, 2-tolyl, 3-tolyl, 4-tolyl, naphthyl, biphenyl, 4-phenoxyphenyl, 4-fluorophenyl, 3-carbomethoxyphenyl and 4-carbomethoxyphenyl.

Examples of ketone groups represented by —COR include acetyl, propionyl, t-butylcarbonyl, 2-ethylhexylcarbonyl, phenylcarbonyl (benzoyl), phenoxyphenylcarbonyl, 1-naphthylcarbonyl, 2-naphthylcarbonyl, nicotinoyl, isonicotinoyl, 4-methylphenylcarbonyl, 2-fluorophenylcarbonyl, 3-fluorophenylcarbonyl and 4-fluorophenylcarbonyl.

Examples of imino groups represented by —CR=NR' include phenyl-N-methylimino, methyl-N-methylimino and phenyl-N-phenylimino.

Examples of alkoxy groups represented by —OR include methoxy, ethoxy, 2-methoxyethoxy and t-butoxy, while examples of aryloxy groups represented by —OR include phenoxy, naphthoxy, phenylnaphthoxy and 4-methylphenoxyethoxy.

Examples of thioether groups represented by —SR include thiomethyl, thiobutyl and thiophenyl.

Examples of sulfonyl groups represented by —$SO_2$R include methylsulfonyl, ethylsulfonyl, phenylsulfonyl and tolylsulfonyl.

Examples of ester groups represented by —OCOR include phenylcarboxy, 4-fluorocarboxy and 2-ethylphenylcarboxy, while examples of ester groups represented by —$CO_2$R include methoxycarbonyl, benzoyloxycarbonyl, phenoxycarbonyl, naphthyloxycarbonyl and ethylcarboxy.

Examples of amino groups represented by —NRR' include amino, dimethylamino, methylamino, methylphenylamino and phenylamino.

Examples of amido groups represented by —NRCOR' include N-acetylamino, N-acetylmethylamino, N-benzoylamino and N-benzoylmethylamino.

Examples of aminocarbonyl groups represented by —CONRR' include N,N-dimethylaminocarbonyl, N-butylaminocarbonyl, N-phenylaminocarbonyl, N,N-diphenylaminocarbonyl and N-phenyl-N-methylaminocarbonyl.

Of the aforesaid groups, $A^1$–$A^{12}$ are preferably acetyl, benzoyl, carbomethoxy, formyl, phenoxy, phenoxybenzoyl or phenyl, and particularly phenoxybenzoyl.

Examples of $X^1$ in the structural unit of formula (5) include -$Z^1$-, -$Z^1$—Ph— and —Ph—$Z^1$—Ph—. Here, Ph represents a substituted or unsubstituted phenylene group, while $Z^1$ represents a bivalent group selected from among —Ph—, —O—, —S—, —NR—, —O(CO)—, —O($CO_2$)—, —(CO)NH(CO)—, —NR(CO)—, phthalimide, pyromellitimide, —CO—, —SO—, —$SO_2$—, —P(O)R—, —$CH_2$—, —$CF_2$— and —CRR'—.

Examples of -$Z^1$-include derivatives of bisphenyl A such as -oxy-1,4-phenylene-2,2-isopropylidene-2,2-diyl-phenylene -oxycarbonyl and derivatives of bisphenyl AF and other bisphenyl. Further examples include -hexafluoroisopropylidene-2,2-diyl and 2-phenyl-1,1,1-trifluoroethylidene-2,2-diyl.

Examples of —Ph-$Z^1$—Ph— esters and amides include:
-(phenylene-CONH-phenylene-NHCO)-phenylene-,
-(phenylene-CONH-phenylene)-,
-(phenylene-COO-phenylene-OCO)-phenylene-,
-(phenylene-carbonyl)-phenylene-,
-(phenylene-carbonyl-phenylene-oxo-phenylene-carbonyl)-phenylene-.

Examples of —Ph-$Z^1$—Ph— compounds include polyamides, polyarylates, polyarylene oxides, polycarbonates, polydimethylsiloxanes, polyesters, polyetherketones, polyphenylenes, substituted polyphenylenes, polyphenylene sulfides and polystyrenes.

Examples of polyamides include those which are formed as a result of normal condensation reactions between 1,4-butanediamine, 1,6-hexanediamine, 4,4'-methylenedianiline, 1,3-phenylenediamine, 1,4-phenylenediamine and other diamines on the one hand and dibasic acids such as adipic acid, isophthalic acid, terephthalic acid and succinic acid on the other.

Examples of polyarylates include those which are formed from terephthalic acid or isophthalic acid on the one hand and diols such as bisphenol A (2,2'-isopropylidenediphenol), resorcinol, hydroquinone and 4,4'-dihydroxybiphenyl on the other.

Examples of polyarylene oxides include poly(2,6-dimethyl-1,4-phenyleneoxide), poly(2,6-diphenyl-1,4-phenyleneoxide), poly(oxy-2,3,5,6-tetrafluorophenylene) and poly(oxy-2,6-pyridinediyl) on the other.

Examples of polyesters include those which are formed as a result of normal condensation reactions between diols such as ethyleneglycol, 1,6-hexaneglycol, hydroquinone, propyleneglycol and resorcinol on the one hand and dibasic acids such as adipic acid, isophthalic acid, terephthalic acid and succinic acid on the other.

Examples of polyetherketones include:
(oxy-1,4-phenylene-oxy-1,4-phenylenecarbonyl-1,4-phenylene),
polyetheretherketone,
polyetherketone,
polyetherketoneketone.

These polyarylene polymers can be made to function as polymer electrolytes by introducing substitution groups with ion exchange function as required into polymers formed according to the skeletons described above. In the case of polyarylene polymers it is particularly desirable that they be sulfonated because this allows them to function well as ion exchange resins. There is no particular restriction on the method of sulfonation, and polymers with sulfonic acid groups may be synthesized for instance by introducing a sulfonic acid group into a monomer and then polymerizing it, or by first polymerizing the monomer and then introducing a sulfonic acid group.

The ion exchange capacity of the sulfonated polyarylene polymers, which is a guide to the degree of sulfonation, is preferably within the range 1.5–3.0 meq/g. If it is less than 1.5meq/g, ion conductivity is unsatisfactory. If on the other hand it is in excess of 3.0 meq/g, the polymers have insufficient mechanical strength and poor resistance to thermal decomposition, high temperatures and high humidity.

Ion exchange capacity can be determined, for instance, by measuring in the following manner. Firstly, the sulfonated polyarylene polymer is immersed for five minutes in a 2 mol/L aqueous solution of sodium chloride to replace the sulfonic acid groups protons with sodium. The protons which are released into the solution as a result are neutralized and titrated with a known concentration of sodium hydroxide. The dry weight (W) of the sulfonated polyarylene polymer and the amount of protons (H$^+$) within the volume (V) of sodium hydroxide required to neutralize and titrate it are calculated, and the ion exchange capacity (meq/g) determined in accordance with formula (6). It should be noted that formula (6) illustrates an example where neutralization and titration were implemented in a 0.05 mol/L aqueous solution of NaOH.

Ion exchange capacity (meq/g)=H$^+$/W=(0.05 V×10$^{-3}$/W)×10$^3$  (6)

In the composite polymer electrolyte membrane 3, there is no particular restriction on the second polymer electrolyte which is mixed with the first. However, with a view to alleviating the rigidity caused by the relatively rigid structure of the sulfonated polyarylene polymer which forms the first polymer electrolyte and improving adhesion to the oxygen electrode 1 and fuel electrode 2, it is preferable for the second polymer electrolyte to be of a highly flexible structure. The second polymer electrolyte may be sulfonated in the same manner as the first.

In the composite polymer electrolyte membrane 3, it is desirable for the sulfonate content of the first polymer electrolyte to be 50–95 wt %, and that of the second polymer electrolyte sulfonate 5–50 wt %. If the sulfonate content of the first polymer electrode is less than 50 wt % and that of the second polymer electrolyte in excess of 50 wt %, the composite polymer electrolyte membrane 3 may exhibit insufficient ion conductivity, and it may prove impossible to achieve satisfactory thermal and chemical stability. If on the other hand the sulfonate content of the first polymer electrolyte is in excess of 95 wt % and that of the second polymer electrolyte less than 5 wt %, the rigidity of the sulfonated polyarylene polymer which forms the first polymer electrolyte may mean that the composite polymer electrolyte membrane 3 is not pliable enough, and it may prove impossible to achieve satisfactory adhesion with the oxygen electrode 1 and the fuel electrode 2.

In the composite polymer electrolyte membrane 3, it is more desirable for the sulfonate content of the first polymer electrolyte to be 60–95 wt %, and that of the second polymer electrolyte sulfonate 5–40 wt %. It is even more desirable for the sulfonate content of the first polymer electrolyte to be 70–90 wt %, and that of the second polymer electrolyte sulfonate 10–30 wt %.

With the purpose of ensuring even better adhesion to the oxygen electrode 1 and fuel electrode 2, it is desirable in the composite polymer electrolyte membrane 3 for the first polymer electrolyte to be a sulfonated polyarylene polymer comprising an aromatic compound unit with an electron-attractive group in its principal chain (hereinafter referred to as 'unit A') and one without an electron-attractive group in its principal chain (hereinafter referred to as 'unit B').

Examples of unit A constituting the first polymer electrolyte include at least one of the aromatic compound units represented by the following general formula (7):

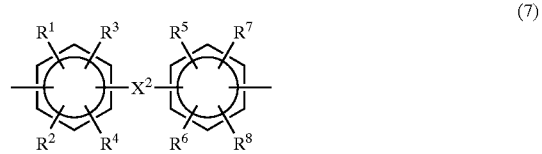

(7)

Examples of —X$^2$— in general formula (7) include at least one bivalent electron-attractive group selected from among —CO—, —CONH—, —(CF$_2$)$_p$—(where p is an integer between 1 and 10, and preferably between 2 and 8), —(CF$_3$)$_2$—, —COO—, —SO— and —SO$_2$—. It should be noted that by electron-attractive group is meant to be a group with a Hammett substituent constant of at least 0.06 at the m-position of the phenyl group, and at least 0.01 at the p-position.

In formula (7), R$^1$–R$^8$ may be hydrogen atoms, halogen atoms, alkyl groups, halogenated alkyl groups, aryl groups, sulfonic acid groups or allyl groups. Examples of halogen atoms include fluorine atoms, of alkyl groups methyl and ethyl groups, of halogenated alkyl groups trifluoromethyl and pentafluoroethyl groups, of allyl groups a propenyl group, and of aryl groups phenyl and pentafluorophenyl groups. R$^1$–R$^8$ may be fluorine atoms in itself, or groups containing fluorine atoms. In order to reduce manufacturing costs it is desirable that they should not be fluorine atoms as such or groups containing fluorine atoms.

Unit A may also assume various linkages including unit A, as -unit A-O-unit A- or -unit A-O-unit A-O-unit A-, where a plurality of units A is linked by at least one ether bond. Introducing an ether bond may enhance the flexibility of the resultant polymer.

Examples of unit B in the structure of the first polymer electrolyte include at least one of the aromatic compound units represented by general formulas (8)–(10).

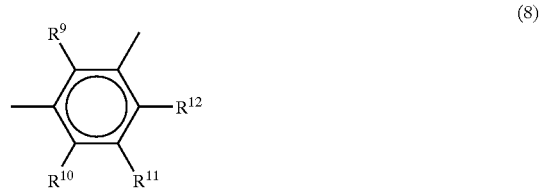

(8)

-continued

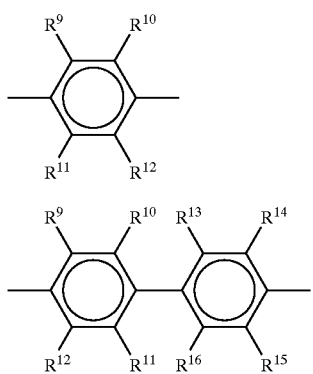

(9)

(10)

$R^9$–$R^{16}$ are either the same or different, and may be hydrogen atoms, halogen atoms, alkyl groups, halogenated alkyl groups, aryl groups or monovalent organic groups including functional groups which do not inhibit polyarylene-generating polymerization reactions.

Examples of halogen atoms include fluorine, chlorine, bromine and iodine atoms, of alkyl groups methyl and ethyl groups, of halogenated alkyl groups trifluoromethyl, pentafluoroethyl, perfluoroethyl, perfluoropropyl, perfluorobutyl and perfluoropentyl groups, of allyl groups a propenyl group, and of aryl groups phenyl and pentafluorophenyl groups.

Examples of monovalent organic groups including functional groups which do not inhibit polyarylene-generating polymerization reactions include aryloxy, aryloxo, arylthiocarbonyl, aryloxycarbonyl, arylthio and arylsulfone groups. The organic groups may be a monovalent organic groups including two or more functional groups, such as aryloxyaryloxo, aryloxyarylsulfone and arylthioaryloxo groups. Moreover, the above aryl groups may be replaced with alkyl, alkylaryl or arylalkyl groups.

In the first polymer electrolyte, the proportion of unit A is 5–70 mol %, preferably 7–50 mol %, while the proportion of unit B is 30–95 mol %, preferably 50–93 mol %. If the proportion of unit A is less than 5 mol % and that of unit B is in excess of 95 mol %, it is impossible to impart sufficient flexibility to the first polymer electrolyte. If on the other hand the proportion of unit A is in excess of 70 mol % and that of unit B is less than 30 mol %, the amount of sulfonic acid groups introduced by sulfonation after polymerization is insufficient to ensure the desired proton conductivity.

Next, the sulfonated polyarylene polymer which forms the first polymer electrolyte can be synthesized by copolymerizing a monomer corresponding to the repeated structural unit (unit A) represented by general formula (7) (hereinafter abbreviated to 'monomer A') and at least one monomer corresponding to the repeated structural unit (unit B) selected from the group represented by general formulas (8)–(10) (hereinafter abbreviated to 'monomer B') within a solvent in the presence of a catalyst system including a transition metal compound, then using a sulfonation agent to sulfonate the resultant copolymer.

Examples of monomer A include aromatic compounds represented by the general formula (7)'.

(7)'

Here, $X^2$ and $R^1$–$R^8$ are the same as in general formula (7). R–R' may be the same or different, and are halogen atoms other than fluorine, or groups represented by —$OSO_2Z^2$—. $Z^2$ is an alkyl group, halogenated alkyl group or aryl group.

Examples of halogen atoms include chlorine, bromine and iodine. Examples of alkyl groups include methyl and ethyl groups. Example of halogenated alkyl groups are trifluoromethyl groups, while examples of aryl groups include phenyl and p-tolyl groups.

Specific examples of monomer A represented by general formula (7)' include:
4,4'-dichlorobenzophenone,
2,4'-dichlorobenzophenone,
3,3'-dichlorobenzophenone,
4,4'-dibromobenzophenone,
2,4'-dibromobenzophenone,
3,3'-dibromobenzophenone,
4,4'-diiodobenzophenone,
2,4'-diiodobenzophenone,
3,3'-diiodobenzophenone,
bis(4-trifluoromethylsulfonyloxyphenyl)ketone,
bis(3-trifluoromethylsulfonyloxyphenyl)ketone,
4,4'-dichlorobenzanilide,
3,3'-dichlorobenzanilide,
3,4'-dichlorobenzanilide,
4,4'-dibromobenzanilide,
3,3'-dibromobenzanilide,
3,4'-dibromobenzanilide,
4,4'-diiodobenzanilide,
3,3'-diiodobenzanilide,
3,4'-diiodobenzanilide,
bis(chlorophenyl)difluoromethane,
bis(chlorophenyl)tetrafluoroethane,
bis(chlorophenyl)hexafluoropropane,
bis(chlorophenyl)octafluorobutane,
bis(chlorophenyl)decafluoropentane,
bis(chlorophenyl)dodecafluorohexane,
bis(chlorophenyl)tetradecafluoroheptane,
bis(chlorophenyl)hexadecafluorooctane,
bis(chlorophenyl)octadecafluorononane,
bis(chlorophenyl)eicosafluorodecane,
bis(bromophenyl)difluoromethane,
bis(bromophenyl)tetrafluoroethane,
bis(bromophenyl)hexafluoropropane,
bis(bromophenyl)octafluorobutane,
bis(bromophenyl)decafluoropentane,
bis(bromophenyl)dodecafluorohexane,
bis(bromophenyl)tetradecafluoroheptane,
bis(bromophenyl)hexadecafluorooctane,
bis(bromophenyl)octadecafluorononane,
bis(bromophenyl)eicosafluorodecane,
bis(iodophenyl)difluoromethane,
bis(iodophenyl)tetrafluoroetane,
bis(iodophenyl)hexafluoropropane,
bis(iodophenyl)octafluorobutane,
bis(iodophenyl)decafluoropentane,
bis(iodophenyl)dodecafluorohexane,
bis(iodophenyl)tetradecafluoroheptane, bis(iodophenyl)hexadecafluorooctane,
bis(iodophenyl)octadecafluorononane,
bis(iodophenyl)eicosafluorodecane,
2,2-bis(4-chlorophenyl)hexafluoropropane,
2,2-bis(3-chlorophenyl)hexafluoropropane,
2,2-bis(4-bromophenyl)hexafluoropropane,
2,2-bis(3-bromophenyl)hexafluoropropane,
2,2-bis(4-iodophenyl)hexafluoropropane,
2,2-bis(3-iodophenyl)hexafluoropropane,
bis(4-trifuoromethylsulfonyloxyphenyl)hexafluoropropane,
bis(3-trifluoromethylsulfonyloxyphenyl)hexafluoropropane,
4-chlorobenzoic acid-4-chlorophenyl,
4-chlorobenzoic acid-3-chlorophenyl,
3-chlorobenzoic acid-3-chlorophenyl,
3-chlorobenzoic acid-4-chlorophenyl,
4-bromobenzoic acid-4-bromophenyl,
4-bromobenzoic acid-3-bromophenyl,
3-bromobenzoic acid-3-bromophenyl,
3-bromobenzoic acid-4-bromophenyl,
bis(4-chlorophenyl)sulfoxide,
bis(3-chlorophenyl)sulfoxide,
bis(4-bromophenyl)sulfoxide,
bis(3-bromophenyl)sulfoxide,
bis(4-iodophenyl)sulfoxide,
bis(3-iodophenyl)sulfoxide,
bis(4-trifluoromethylsulfonyloxyphenyl)sulfoxide,
bis(3-trifluoromethylsulfonyloxyphenyl)sulfoxide,
bis(4-chlorophenyl)sulfone,
bis(3-chlorophenyl)sulfone,
bis(4-bromophenyl)sulfone,
bis(3-bromophenyl)sulfone,
bis(4-iodophenyl)sulfone,
bis(3-iodophenyl)sulfone,
bis(4-trifluoromethylsulfonyloxyphenyl)sulfone,
bis(3-trifluoromethylsulfonyloxyphenyl)sulfone.

Specific examples of monomer A with the structure -unit A-O-unit A include:
4,4'-bis(4-chlorobenzoyl)diphenylether,
4,4'-bis(3-chlorobenzoyl)diphenylether,
4,4'-bis(4-bromobenzoyl)diphenylether,
4,4'-bis(3-bromobenzoyl)diphenylether,
4,4'-bis(4-iodobenzoyl)diphenylether,
4,4'-bis(3-iodobenzoyl)diphenylether,
4,4'-bis(4-trifluoromethylsulfonyloxyphenyl)diphenylether,
4,4'-bis(3-trifluoromethylsulfonyloxyphenyl)diphenylether,
4,4'-bis(4-methylsulfonyloxyphenyl)diphenylether,
4,4'-bis(3-methylsulfonyloxyphenyl)diphenylether,
4,4'-bis(4-chlorobenzoylamino)diphenylether,
3,4'-bis(4-chlorobenzoylamino)diphenylether,
4,4'-bis(3-chlorobenzoylamino)diphenylether,
3,4'-bis(3-chlorobenzoylamino)diphenylether,
4,4'-bis(4-bromobenzoylamino)diphenylether,
3,4'-bis(4-bromobenzoylamino)diphenylether,
4,4'-bis(3-bromobenzoylamino)diphenylether,
3,4'-bis(3-bromobenzoylamino)diphenylether,
4,4'-bis(4-iodobenzoylamino)diphenylether,
3,4'-bis(4-iodobenzoylamino)diphenylether,
4,4'-bis(3-iodobenzoylamino)diphenylether,
3,4'-bis(3-iodobenzoylamino)diphenylether,
4,4'-bis(4-trifluoromethylsulfonyloxyphenyl)diphenylether,
3,4'-bis(4-trifluoromethylsulfonyloxyphenyl)diphenylether,
4,4'-bis(3-trifluoromethylsulfonyloxyphenyl)diphenyl ether,
3,4'-bis(3-trifluoromethylsulfonyloxyphenyl)diphenylether,
4,4'-bis(4-methylsulfonyloxyphenyl)diphenylether,
3,4'-bis(4-methylsulfonyloxyphenyl)diphenylether,
4,4'-bis(3-methylsulfonyloxyphenyl)diphenylether,
3,4'-bis(3-methylsulfonyloxyphenyl)diphenylether,
4,4'-bis(4-chlorophenylsulfonyl)diphenylether,
3,4'-bis(4-chlorophenylsulfonyl)diphenylether,
4,4'-bis(3-chlorophenylsulfonyl)diphenylether,
3,4'-bis(3-chlorophenylsulfonyl)diphenylether,
4,4'-bis(4-bromophenylsulfonyl)diphenylether,
3,4'-bis(4-bromophenylsulfonyl)diphenylether,
4,4'-bis(3-bromophenylsulfonyl)diphenylether,
3,4'-bis(3-bromophenylsulfonyl)diphenylether,
4,4'-bis(4-iodophenylsulfonyl)diphenylether,
3,4'-bis(4-iodophenylsulfonyl)diphenylether,
4,4'-bis(3-iodophenylsulfonyl)diphenylether,
3,4'-bis(3-iodophenylsulfonyl)diphenylether,
4,4'-bis(4-trifluoromethylsulfonyloxyphenylsulfonyl) diphenylether,
3,4'-bis(4-trifluoromethylsulfonyloxyphenylsulfonyl) diphenylether,
4,4'-bis(3-trifluoromethylsulfonyloxyphenylsulfonyl) diphenylether,
3,4'-bis(3-trifluoromethylsulfonyloxyphenylsulfonyl) diphenylether,
4,4'-bis(4-methylsulfonyloxyphenylsulfonyl)diphenylether,
3,4'-bis(4-methylsulfonyloxyphenylsulfonyl)diphenylether,
4,4'-bis(3-methylsulfonyloxyphenylsulfonyl)diphenylether,
3,4'-bis(3-methylsulfonyloxyphenylsulfonyl)diphenylether,
4,4'-bis(4-chlorophenyl)diphenylether dicarboxylate,
3,4'-bis(4-chlorophenyl)diphenylether dicarboxylate,
4,4'-bis(3-chlorophenyl)diphenylether dicarboxylate,
3,4'-bis(3-chlorophenyl)diphenylether dicarboxylate,
4,4'-bis(4-bromophenyl)diphenylether dicarboxylate,
3,4'-bis(4-bromophenyl)diphenylether dicarboxylate,
4,4'-bis(3-bromophenyl)diphenylether dicarboxylate,
3,4'-bis(3-bromophenyl)diphenylether dicarboxylate,
4,4'-bis(4-iodophenyl)diphenylether dicarboxylate,
3,4'-bis(4-iodophenyl)diphenylether dicarboxylate,
4,4'-bis(3-iodophenyl)diphenylether dicarboxylate,
3,4'-bis(3-iodophenyl)diphenylether dicarboxylate,
4,4'-bis(4-trifluoromethylsulfonyloxyphenyl)diphenylether dicarboxylate,
3,4'-bis(4-trifluoromethylsulfonyloxyphenyl)diphenylether dicarboxylate,
4,4'-bis(3-trifluoromethylsulfonyloxyphenyl)diphenylether dicarboxylate,
3,4'-bis(3-trifluoromethylsulfonyloxyphenyl)diphenylether dicarboxylate,
4,4'-bis(4-trifluoromethylsulfonyloxyphenyl)diphenylether dicarboxylate,
3,4'-bis(4-trifluoromethylsulfonyloxyphenyl)diphenylether dicarboxylate,
4,4'-bis(3-methylsulfonyloxyphenyl)diphenylether dicarboxylate,
3,4'-bis(3-methylsulfonyloxyphenyl)diphenylether dicarboxylate,
4,4'-bis[(4-chlorophenyl)-1,1,1,3,3,3-hexafluoropropyl] diphenylether,
3,4'-bis[(4-chlorophenyl)-1,1,1,3,3,3-hexafluoropropyl] diphenylether,
4,4'-bis[(3-chlorophenyl)-1,1,1,3,3,3-hexafluoropropyl] diphenylether,
3,4'-bis[(3-chlorophenyl)-1,1,1,3,3,3-hexafluoropropyl] diphenylether,
4,4'-bis[(4-bromophenyl)-1,1,1,3,3,3-hexafluoropropyl] diphenylether,
3,4'-bis[(4-bromophenyl)-1,1,1,3,3,3-hexafluoropropyl] diphenylether,
4,4'-bis[(3-bromophenyl)-1,1,1,3,3,3-hexafluoropropyl] diphenylether,
3,4'-bis[(3-bromophenyl)-1,1,1,3,3,3-hexafluoropropyl] diphenylether, 4,4'-bis[(4-iodophenyl)-1,1,1,3,3,3-hexafluoropropyl]diphenylether,
3,4'-bis[(4-iodophenyl)-1,1,1,3,3,3-hexafluoropropyl]diphenylether,
4,4'-bis[(3-iodophenyl)-1,1,1,3,3,3-hexafluoropropyl]diphenylether,
3,4'-bis[(3-iodophenyl)-1,1,1,3,3,3-hexafluoropropyl]diphenylether,
4,4'-bis[(4-trifluoromethylsulfonyloxyphenyl)-1,1,1,3,3,3-hexafluoropropyl]diphenylether,
3,4'-bis[(4-trifluoromethylsulfonyloxyphenyl)-1,1,1,3,3,3-hexafluoropropyl]diphenylether,
4,4'-bis[(3-trifluoromethylsulfonyloxyphenyl)-1,1,1,3,3,3-hexafluoropropyl]diphenylether,
3,4'-bis[(3-trifluoromethylsulfonyloxyphenyl)-1,1,1,3,3,3-hexafluoropropyl]diphenylether,
4,4'-bis[(4-methylsulfonyloxyphenyl)-1,1,1,3,3,3-hexafluoropropyl]diphenylether,
3,4'-bis[(4-methylsulfonyloxyphenyl)-1,1,1,3,3,3-hexafluoropropyl]diphenylether,
4,4'-bis[(3-methylsulfonyloxyphenyl)-1,1,1,3,3,3-hexafluoropropyl]diphenylether,
3,4',-bis[(3-methylsulfonyloxyphenyl)-1,1,1,3,3,3-hexafluoropropyl]diphenylether,
4,4'-bis[(4-chlorophenyl)tetrafluoroethyl]diphenylether,
4,4'-bis[(3-chlorophenyl)tetrafluoroethyl]diphenylether,
4,4'-bis[(4-chlorophenyl)hexafluoropropyl]diphenylether,
4,4'-bis[(3-chlorophenyl) hexafluoropropyl]diphenylether,
4,4'-bis[(4-chlorophenyl)octafluorobutyl]diphenylether,
4,4'-bis[(3-chlorophenyl)octafluorobutyl]diphenylether,
4,4'-bis[(4-chlorophenyl)decafluoropentyl]diphenylether,
4,4'-bis[(3-chlorophenyl)decafluoropentyl]diphenylether,
4,4'-bis[(4-butylphenyl)tetrafluoroethyl]diphenylether,
4,4'-bis[(3-butylphenyl)tetrafluoroethyl]diphenylether,
4,4'-bis[(4-butylphenyl)hexafluoropropyl]diphenylether,
4,4'-bis[(3-butylphenyl)hexafluoropropyl]diphenylether,
4,4'-bis[(4-butylphenyl)octafluorobutyl]diphenylether,
4,4'-bis[(3-butylphenyl)octafluorobutyl]diphenylether,
4,4'-bis[(4-butylphenyl)decafluoropentyl]diphenylether,
4,4'-bis[(3-butylphenyl)decafluoropentyl]diphenylether,
4,4'-bis[(4-iodophenyl)tetrafluoroethyl]diphenylether,
4,4'-bis[(3-iodophenyl)tetrafluoroethyl]diphenylether,
4,4'-bis[(4-iodophenyl)hexafluoropropyl]diphenylether,
4,4'-bis[(3-iodophenyl)hexafluoropropyl]diphenylether,
4,4'-bis[(4-iodophenyl)octafluorobutyl]diphenylether,
4,4'-bis[(3-iodophenyl)octafluorobutyl]diphenylether,
4,4'-bis[(4-iodophenyl)decafluoropentyl]diphenylether,
4,4'-bis[(3-iodophenyl)decafluoropentyl]diphenylether,
4,4'-bis[(4-trifluoromethylsulfonyloxyphenyl) tetrafluoroethyl]diphenylether,
4,4'-bis[(3-trifluoromethylsulfonyloxyphenyl) tetrafluoroethyl]diphenylether,
4,4'-bis[(4-trifluoromethylsulfonyloxyphenyl) hexafluoropropyl]diphenylether,
4,4'-bis[(3-trifluoromethylsulfonyloxyphenyl) hexafluoropropyl]diphenylether,
4,4'-bis[(4-trifluoromethylsulfonyloxyphenyl) octafluorobutyl]diphenylether,
4,4'-bis[(3-trifluoromethylsulfonyloxyphenyl) octafluorobutyl]diphenylether,
4,4'-bis[(4-trifluoromethylsulfonyloxyphenyl) decafluoropentyl]diphenylether,
4,4'-bis[(3-trifluoromethylsulfonyloxyphenyl) decafluoropentyl]diphenylether,
4,4'-bis[(4-methylsulfonyloxyphenyl)tetrafluoroethyl]diphenylether,
4,4'-bis[(3-methylsulfonyloxyphenyl)tetrafluoroethyl]diphenylether,
4,4'-bis[(4-methylsulfonyloxyphenyl)hexafluoropropyl]diphenylether,
4,4'-bis[(3-methylsulfonyloxyphenyl)hexafluoropropyl]diphenylether,
4,4'-bis[(4-methylsulfonyloxyphenyl)octafluorobutyl]diphenylether,
4,4'-bis[(3-methylsulfonyloxyphenyl)octafluorobutyl]diphenylether,
4,4'-bis[(4-methylsulfonyloxyphenyl)decafluoropentyl]diphenylether,
4,4'-bis[(3-methylsulfonyloxyphenyl)decafluoropentyl]diphenylether.

Monomer A may be a compound which includes a fluorine atom as substitution group, but in order to reduce costs it is preferable that it is not so.

Examples of monomer B include aromatic compounds represented by the general formulas (8)'–(10)'.

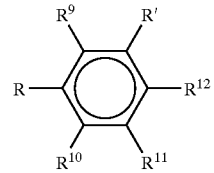

(8)'

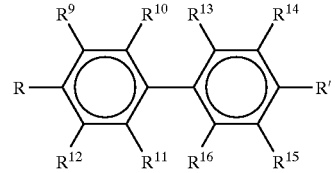

(9)'

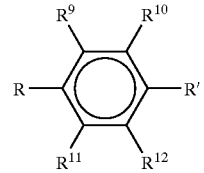

(10)'

Here, $R^9$–$R^{16}$ are the same as in general formulas (8)–(10), and R–R' are the same as in general formula (7)'.

Specific examples of monomer B represented by general formula (8)' include:
m-dichlorobenzene,
m-dibromobenzene,
m-diiodobenzene,
m-dimethylsulfonyloxybenzene,
2,4-dichlorotoluene,
2,4-dibromotoluene,
2,4-diiodootoluene,
3,5-dichlorotoluene,
3,5-dibromotoluene,
3,5-diiodootoluene,
2,6-dichlorotoluene,
2,6-dibromotoluene,
2,6-diiodootoluene,
3,5-dimethylsulfonyloxytoluene,
2,6-dimethylsulfonyloxytoluene,
2,4-dichlorobenzotrifluoride,
2,4-dibromobenzotrifluoride,
2,4-diiodobenzotrifluoride,
3,5-dichlorobenzotrifluoride,
3,5-dibromobenzotrifluoride,
3,5-diiodobenzotrifluoride,
1,3-dibromo-2,4,5,6-tetrafluorobenzene.

Specific examples of monomer B represented by general formula (9)' include:
4'-phenoxy-2,4-dichlorobenzophenone,
2,5-dichloro-4'-phenoxybenzophenone,
p-dichlorobenzene,
p-dibromobenzene,
p-diiodobenzene,
p-dimethylsulfonyloxybenzene,
2,5-dichlorotoluene,
2,5-dibromotoluene,
2,5-diiodotoluene,
2,5-dimethylsulfonyloxybenzene,
2,5-dichloro-p-xylene,
2,5-dibromo-p-xylene,
2,5-diiodo-p-xylene,
2,5-dichlorobenzotrifluoride,
2,5-dibromobenzotrifluoride,
2,5-diiodobenzotrifluoride,
1,4-dichloro-2,3,5,6-tetrafluorobenzene,
1,4-dibromo-2,3,5,6-tetrafluorobenzene,
1,4-diiodo-2,3,5,6-tetrafluorobenzene.

Specific examples of monomer B represented by general formula (10)' include:
4,4'-dibromobiphenyl,
4,4'-diiodobiphenyl,
4,4'-dimethylsulfonyloxybiphenyl,
4,4'-dimethylsulfonyloxy-3,3'-dipropenylbiphenyl,
4,4'-dimethylsulfonyloxy-3,3'-dimethylbiphenyl,
4,4'-dimethylsulfonyloxy-3,3'-difluorobiphenyl,
4,4'-dimethylsulfonyloxy-3,3', 5,5'-tetrafluorobiphenyl,
4,4'-dibromooctafluorobiphenyl.

Monomer B may be a compound which includes a fluorine atom as substitution group, but in order to reduce costs it is preferable that it is not so.

Of the examples of monomer B represented by general formulas (8)'–(10)', the most desirable on account of their excellent solubility in the solvent used in the polymerization reaction with monomer A and consequent ease of polymerization are dichlorobenzoic acid derivatives such as 4'-phenoxy-2,5-dichlorobenzophenone, 4'-phenoxy-2,4-dichlorobenzophenone, 4'-phenoxyphenyl-2,5-dichlorobenzoate and 4'-phenoxyphenyl-2,4-dichlorobenzoate. Of these, 4'-phenoxy-2,5-dichlorobenzophenone is most desirable because when copolymerized in particular with monomer A represented by general formula (7)' it makes it possible to achieve a mechanically strong polymer electrolyte with outstanding properties of creep resistance.

The copolymerization ratio of at least one monomer A represented by general formula (7)' and at least one monomer B selected from the groups of aromatic compounds represented by general formulas (8)'–(10)' is the same as the ratios of units A and B. That is to say, the amount of monomer A used is 5–70 mol %, and preferably 7–50 mol %, while that of monomer B is 30–95 wt %, and preferably 50–93 wt %. However, if unit A is ether-bonded, the ratio of -unit A-O-unit A is 3–40 mol %, and preferably 5–35 mol %.

If compounds represented by general formula (8)' are used as monomer B, excellent solubility of both monomers in the polymerization solution and ease of polymerization are achieved by ensuring that monomer B constitutes preferably no more than 50 mol % of the sum of monomers A and B, and in particular if it constitutes no more than 30 mol %.

If compounds represented by general formula (9)' are used as monomer B, excellent solubility of both monomers in the polymerization solution and ease of polymerization are achieved by ensuring that monomer B constitutes preferably no less than 10 mol % of the sum of monomers A and B, and in particular if it constitutes no less than 20 mol %.

If compounds represented by general formula (10)' are used as monomer B, excellent solubility of both monomers in the polymerization solution and ease of polymerization are achieved by ensuring that monomer B constitutes preferably no more than 50 mol % of the sum of monomers A and B, and in particular if it constitutes no more than 30 mol %.

The catalyst used when manufacturing polyarylene polymers by copolymerizing monomers A and B is a catalyst system including a transition metal salt, essential components of which are the transition metal salt, a ligand and a reducing agent. The transition metal salt and ligand may be replaced with a transition metal or salt thereof with a ligand already in place, and prescribed 'salts' may be added with the object of increasing the rate of polymerization.

Here, examples of transition metal salts include nickel compounds such as nickel chloride, nickel bromide, nickel iodide and nickel acetylacetonate, palladium compounds such as palladium chloride, palladium bromide and palladium iodide, iron compounds such as iron chloride, iron bromide and iron iodide, and cobalt compounds such as cobalt chloride, cobalt bromide and cobalt iodide.

Examples of ligands include triphenylphosphine, 2,2'-bipyridine, 1,5-cyclooctadiene and 1,3-bis(diphenylphosphino)propane.

Examples of reducing agents include iron, zinc, manganese, aluminium, magnesium, sodium and calcium. These reducing agents may be further activated by bringing them into contact with organic or other acids.

Examples of transition metals or salts thereof with a ligand already in place include:
bis(triphenylphosphine)nickel chloride,
bis(triphenylphosphine)nickel bromide,
bis(triphenylphosphine)nickel iodide,
bis(triphenylphosphine)nickel nitrate,
(2,2'-bipyridine)nickel chloride,
(2,2'-bipyridine)nickel bromide,
(2,2'-bipyridine)nickel iodide,
(2,2'-bipyridine)nickel nitrate,
bis(1,5-cyclooctadiene)nickel,
tetrakis(triphenylphosphine)nickel,
tetrakis(triphenylphosphite)nickel,
tetrakis(triphenylphosphine)palladium.

Examples of salts which may be added to the catalyst system in order to improve the rate of polymerization include sodium fluoride, sodium chloride, sodium bromide, sodium iodide, sodium sulfate and other sodium compounds, potassium fluoride, potassium chloride, potassium bromide, potassium iodide, potassium sulfate and other potassium compounds, along with tetraethylammonium fluoride, tetraethylammonium chloride, tetraethylammonium bromide, tetraethylammonium iodide, tetraethylammonium sulfate and similar ammonium compounds.

In the catalyst system, the amount of transition metal salts or of transition metals or salts thereof with ligands already in place is normally 0.0001–10 mol, and preferably 0.01–0.5 mol, for every 1 mol of the sum of monomers A and B represented by general formulas (7)'–(10)'. If it is less than 0.0001 mol, the polymerization reaction may not proceed satisfactorily. If on the other hand it is in excess of 10 mol, the molecular weight of the resultant polyarylene polymer may not be great enough.

In the catalyst system, the amount of ligand in relation to the transition metal or salt thereof is normally 0.1–100 mol, and preferably 1.0–10 mol, for 1 mol of the transition metal or salt thereof. If it is less than 0.1 mol, polymerization activity may be insufficient. If on the other hand it is in excess of 100 mol, the molecular weight of the resultant polyarylene polymer may not be great enough.

In the catalyst system, the amount of reducing agent is normally 0.1–100 mol, and preferably 1–10 mol, for every 1 mol of the sum of monomers A and B represented by general formulas (7)'–(10)'. If it is less than 0.1 mol, the polymerization reaction may not proceed satisfactorily. If on the other hand it is in excess of 100 mol, it may become difficult to refine the resultant polyarylene polymer.

In the catalyst system, the amount of salts added in order to improve the rate of polymerization is normally 0.001–100 mol, and preferably 0.01–1 mol, for every 1 mol of the sum of monomers A and B represented by general formulas (7)'–(10)'. If it is less than 0.001 mol, the rate of polymerization may not be increased satisfactorily. If on the other hand it is in excess of 100 mol, it may become difficult to refine the resultant polyarylene polymer.

Examples of polymerization solvent include tetrahydrofuran, cyclohexanone, dimethyl sulfoxide, N,N-dimethyl formamide, N,N-dimetyl acetamide, N-methyl-2-pyrrolidone, gamma-butyrolactone and gamma-butyrolactam. The polymerization catalyst is preferably dried well before use. The sum concentration of monomers A and B represented by general formulas (7)'–(10)' within the polymerization catalyst is normally 1–90 wt %, and preferably 5–40 wt %. The polymerization temperature is normally 0–200° C., and preferably 50–80° C. The polymerization time is normally 0.5–100 hours, and preferably 1–40 hours.

The weight-average molecular weight of the polyarylene polymer as polystyrene is 1,000–1,000,000, and preferably 1,500–200,000.

The structure of the polyarylene polymer can be confirmed for instance on the basis of C—O—C absorption at infrared absorption spectra of 1230–1250 cm$^{-1}$, and C=O absorption at 1640–1660 cm$^{-1}$, or alternatively from the aromatic proton peak at nuclear magnetic resonance (1 H NMR) spectra of 6.8–8.0 ppm.

For instance, the reaction formula when a monomer A represented by general formula (7)' and a monomer B represented by general formula (9)' are used to produce a polymer comprising repeated structural units (without sulfonic acid groups) represented by general formulas (7) and (9) can be represented by formula (11).

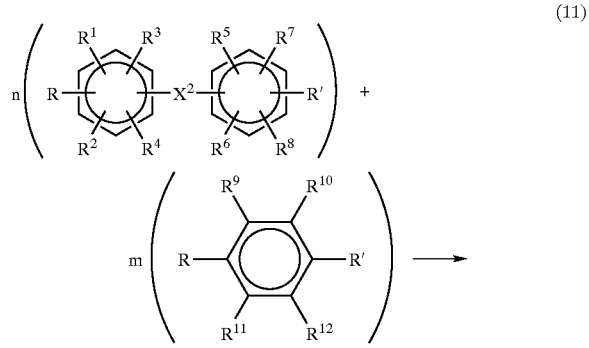

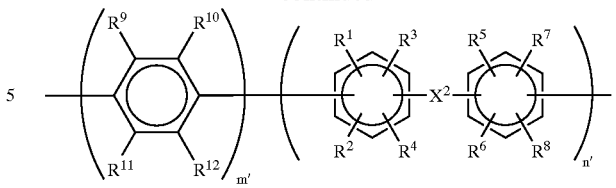

Where n and m are integral and n≧1, m≧1, respectively, n' and m' are integral and n'≧0, m'≧0, respectively, and n≧n', m≧m'.

It should be noted that formula (11) represents a random copolymer formed by copolymerizing a repeated structural unit represented by general formula (7) and one represented by structural formula (9) in a ratio of m':n', and does not signify a block copolymer of m' repeated structural units represented by general formula (7) and n' repeated structural units represented by structural formula (9).

Next, the polyarylene polymer can be sulfonated by reacting it with sulfuric anhydride, fuming sulfuric acid, chlorosulfonic acid, sulfuric acid, sodium hydrogensulfite or a similar sulfonating agent under the known conditions in the presence or absence of a solvent. Examples of solvents which are employed in sulfonation include not only hydrocarbon solvents such as n-hexane, ether solvents such as tetrahydrofuran or dioxane, and non-proton polar solvents such as dimethyl acetamide, dimethyl formamide and dimethyl sulfoxide, but also halogenated hydrocarbons such as tetrachloroethane, dichloroethane, chloroform and methylene chloride.

There is no particular restriction on the sulfonation reaction temperature, but it is normally −50–200° C., and preferably −10–100° C. The sulfonation reaction time is normally 0.5–1000 hours, and preferably 1–200 hours.

The number of sulfonic acid groups in the sulfonated polyarylene polymer produced by sulfonation is normally 0.05–2, and preferably 0.3–1.5 for every unit B constituting the polymer. If the number is less than 0.05, the proton conductivity of the resultant sulfonated polyarylene polymers is unsatisfactory. If on the other hand it is in excess of two, increased hydrophilia results in a water-soluble polymer, or even if not, it will have poor durability against hot water.

The sulfonated polyarylene polymer is best suited as a polymer electrolyte membrane for a solid polymer electrolyte fuel cell if unit A is an aromatic compound unit with a benzophenone-4,4'-cs-diyl structure and unit B is an aromatic compound unit with a 4'-phenoxy-benzophenone-2,5-diyl structure. In this case it is desirable that unit A constitute 7–35 mol %, and unit B 65–93 mol %. Most suitably, unit A constitutes 8–30 mol %, and unit B 70–92 mol %. It is desirable for the sulfonated polyarylene polymer preferably to have an ion exchange capacity of 1.5–3.0meq/g, and preferably 1.8–3.0 meq/g. Ion exchange capacity can easily be adjusted by varying the molar ratio of units A and B to alter the amount of sulfonic acid groups introduced into the sulfonated polyarylene polymer.

The structure of the polyarylene polymer can be confirmed for instance on the basis of S=O absorption at infrared absorption spectra of 1030–1045 cm$^{-1}$ and 1160–1190 cm$^{-1}$, C—O—C absorption at 1130–1250 cm$^{-1}$, C=O absorption at 1640–1660 cm$^{-1}$, or aromatic proton peak at nuclear magnetic resonance (1 H NMR) spectra of 6.8–8.0 ppm. Moreover, it is possible to determine the amount of sulfonic acid groups by neutralizing and titrating the sulfonic acid, or by elemental analysis.

The sulfonated polyarylene polymer which forms the first polymer electrolyte exhibits a high degree of proton conductivity over a wide range of temperatures, and has excellent properties of creep resistance, mechanical strength in general and resistance to hot water. Moreover, the fact that it includes unit A represented by general formula (7) in the range specified above imparts a flexibility which permits of excellent adhesion to the electrodes of the solid polymer electrolyte fuel cell even when it is mixed with a largely unrestricted second polymer electrolyte to form a composite polymer electrolyte membrane.

However, in the present embodiment the sulfonated polyarylene polymer of the first polymer electrolyte is mixed with a second polymer electrolyte which of itself is flexible, thus making it possible to produce a composite polymer electrolyte membrane with even more outstanding properties of adhesion to the electrodes of the solid polymer electrolyte fuel cell.

It is desirable that the second polymer electrolyte be a sulfonated polyether or sulfonated polythioether polymer electrolyte. Admixture of a flexible second polymer electrolyte of this sort allows the rigidity of the sulfonated polyarylene polymer which constitutes the first polymer electrolyte to be alleviated even further. Moreover, considerations of cheapness make it preferable for the second polymer electrolyte not to include a perfluoroalkylene structure.

By polyether polymer here is meant a high-molecular compound containing —O—or similar groups in the principal chain in a ratio of at least 0.5 to each phenylene group. Examples include repeated units selected from among groups including:
—Ph—O—,
—Ph—O—Ph—CO—,
—Ph—O—Ph—O—Ph—CO—,
—Ph—O—Ph—CO—Ph—CO—,
—Ph—O—Ph—O—Ph—CO—Ph—CO—,
—Ph—O—Ph—CO—Ph—O—Ph—CO—Ph—CO—,
—Ph—O—Ph—CO—Ph—CO—Ph—O—Ph—CO—Ph—CO—,
—Ph—Ph—O—Ph—CO—Ph—CO—(where —Ph— denotes —$C_6H_4$—)
either singly or in combination with other aromatic compound units. Meanwhile, by polysulfide polymers is meant high-molecular compounds in which an —S— is substituted for the —O— of a polyether polymer.

In addition to polyether and polysulfide polymers it is also possible to employ high-molecular compounds with —CO—, —CONH—, —COO—, —SO—, —$SO_2$—and similar groups in their principal chains as high-molecular compounds forming the second polymer electrolyte.

Specific examples of such high-molecular compounds include polyether ether ketone (PEEK), polyether sulfone (PES), polysulfone (PSF), polyether imide (PEI), polyphenylene sulfide (PPS), polyphenylene oxide (PPO) and similar compounds. Polyphenylene oxide, polyether ether ketone, polyether sulfone or polyphenylene sulfide are particularly desirable. These high-molecular compounds can be sulfonated by the same method as the first polymer electrolyte.

In the second polymer electrolyte, the —O—, —S—, —CO—, —CONH—, —COO—, —SO—, —$SO_2$—and other groups all have bond angles of less than 180°, as a result of which they have structures with considerably higher flexibility than the sulfonated polyarylene polymers employed in the first polymer electrolyte.

The composite polymer electrolyte membrane can be manufactured, for instance, by dissolving the first and second polymer electrolytes separately in organic solvents to produce uniform solutions, then mixing the two solutions, casting the resultant uniform solution in a flat mould and allowing it to dry. Examples of organic solvents include dimethyl sulfoxide, N,N-dimethyl formamide, N,N-dimethyl acetamide, N-methylpyrrolidone and other nonproton polar solvents. From the standpoint of film formation, the ratio of the first to the second electrolyte when mixed is preferably between 95:5 and 70:30 as solids.

Apart from the above casting method, composite polymer electrolyte membrane may also be manufactured by fusion molding.

There follows a description of the second embodiment of the present invention.

A solid polymer electrolyte fuel cell which employs the composite polymer electrolyte membrane to which the second embodiment of the present invention pertains has an membrane electrode assembly which with the exception of the composite polymer electrolyte membrane 3 illustrated in FIG. 1 is exactly the same as the solid polymer electrolyte fuel cell to which the first embodiment of the present invention pertains.

There follows a description of the structure of the composite polymer electrolyte membrane 3 to which the second embodiment of the present invention pertains.

The composite polymer electrolyte membrane 3 to which the second embodiment of the present invention pertains has a matrix comprising a first polymer electrolyte selected from among polyarylene polymer sulfonates and having an ion exchange capacity of at least 1.5 meq/g but less than 3.0 meq/g, and a reinforcement comprising a second polymer electrolyte selected from among sulfonated polyarylene polymers and having an ion exchange capacity of at least 0.5 meq/g but less than 1.5 meq/g, the matrix being retained by the reinforcement.

In the composite polymer electrolyte membrane 3 to which the second embodiment of the present invention pertains, a sulfonated polyarylene polymer is used which comprises an aromatic compound unit with an electron-attractive group in its principal chain (hereinafter referred to as 'unit A') and an aromatic compound unit without an electron-attractive group in its principal chain (hereinafter referred to as 'unit B').

Examples of unit A include the same aromatic units represented by general formula (7) as in the first embodiment. —$X^2$— and $R^1$–$R^8$ are exactly the same as in the first embodiment. $R^1$–$R^8$ may be fluorine atoms in itself or groups containing fluorine atoms, but in order to reduce manufacturing costs it is desirable that they are not so.

Unit A may also assume various linkages including unit A, as -unit A-O-unit A- or -unit A-O-unit A-O-unit A-, where a plurality of units A is linked by at least one ether bond.

Examples of unit B include at least one of the same aromatic compound units represented by general formulas (8)–(10) as in the first embodiment. $R^9$–$R^{16}$ are exactly the same as in the first embodiment.

In order to control the amount of sulfonic acid groups introduced into the sulfonated polyarylene polymer, the proportion of unit A within the polymer is 5–70 mol %, preferably 7–60 mol %, while the proportion of unit B is 30–95 mol %, preferably 40–93 mol %. If the proportion of unit A is less than 5 mol % and that of unit B exceeds 95 mol %, the excessive amount of sulfonic acid groups introduced into the polyarylene polymer makes it impossible to achieve sufficient mechanical strength in the sulfonated polyarylene polymer. If on the other hand the proportion of unit A is in excess of 70 mol % and that of unit B is less than 30 mol %, the amount of sulfonic acid groups introduced into the polyarylene polymer is insufficient to achieve sufficient ion exchange capacity in the sulfonated polyarylene copolymer.

It is also possible to control the amount of sulfonic acid groups introduced into the sulfonated polyarylene polymer by varying the sulfonation conditions.

The sulfonated polyarylene polymer can be synthesized by copolymerizing a monomer corresponding to the repeated structural unit (unit A) represented by general formula (7) (hereinafter abbreviated to 'monomer A') and at least one monomer corresponding to the repeated structural unit (unit B) selected from the group represented by general formulas (8)–(10) (hereinafter abbreviated to 'monomer B') within a solvent in the presence of a catalyst system including a transition metal compound, then using a sulfonation agent to sulfonate the resultant copolymer.

Examples of monomer A include the same aromatic compounds represented by the general formula (7)' as in the first embodiment. Specific examples of monomer A include the same compounds as in the first embodiment, as are specific examples of monomer A with the structure -unit A-O-unit A.

Monomer A may be a compound which includes a fluorine atom as substitution group, but in order to reduce costs it is preferable that it is not so.

Examples of monomer B include the same aromatic compounds represented by the general formulas (8)'–(10)' as in the first embodiment. Specific examples of monomer B include the same compounds as in the first embodiment.

Monomer B may be a compound which includes a fluorine atom as substitution group, but in order to reduce costs it is preferable that it is not so.

Of the examples of monomer B represented by general formulas (8)'–(10)', the most desirable on account of their excellent solubility in the solvent used in the polymerization reaction with monomer A and consequent ease of polymerization are dichlorobenzoic acid derivatives such as 4'-phenoxy-2,5-dichlorobenzophenone, 4'-phenoxy-2,4-dichlorobenzophenone, 4'-phenoxyphenyl-2,5-dichlorobenzoate and 4'-phen-oxyphenyl-2,4-dichlorobenzoate. Of these, 4'-phenoxy-2,5-dichlorobenzophenone is most desirable because when copolymerized in particular with monomer A represented by general formula (7)' it makes it possible to achieve a mechanically strong polymer electrolyte with outstanding properties of creep resistance.

The copolymerization ratio of at least one monomer A represented by general formula (7)' and at least one monomer B selected from the groups of aromatic compounds represented by general formulas (8)'–(10)' is the same as the ratios of units A and B. That is to say, the amount of monomer A used is 5–70 mol %, and preferably 7–60 mol %, while that of monomer B is 30–95 wt %, and preferably 40–93 wt %. However, if unit A is ether-bonded, the ratio of -unit A-O-unit A is 3–40 mol %, and preferably 5–35 mol %.

If compounds represented by general formula (8)' are used as monomer B, excellent solubility of both monomers in the polymerization solution and ease of polymerization are achieved by ensuring that monomer B constitutes preferably no more than 50 mol % of the sum of monomers A and B, and in particular if it constitutes no more than 30 mol %.

If compounds represented by general formula (9)' are used as monomer B, excellent solubility of both monomers in the polymerization solution and ease of polymerization are achieved by ensuring that monomer B constitutes preferably no less than 10 mol % of the sum of monomers A and B, and in particular if it constitutes no less than 20 mol %.

If compounds represented by general formula (10)' are used as monomer B, excellent solubility of both monomers in the polymerization solution and ease of polymerization are achieved by ensuring that monomer B constitutes preferably no more than 50 mol % of the sum of monomers A and B, and in particular if it constitutes no more than 30 mol %.

The polyarylene polymer can be manufactured by copolymerizing monomers A and B under the same polymerization conditions and using the same catalyst system including a transition metal salt and the same solvents as in the first embodiment. The molecular weight of the polyarylene polymer manufactured in this manner is 1,000–1,000,000 as polystyrene conversion weight average molecular weight, and preferably 500–200,000. The structure of the polyarylene polymer can be confirmed with the aid of infrared absorption spectra or nuclear magnetic resonance (1 H NMR) spectra in the same manner as in the first embodiment.

For instance, the reaction formula when a monomer A represented by general formula (7)' and a monomer B represented by general formula (9)' are used to produce a polymer comprising repeated structural units (without sulfonic acid groups) represented by general formulas (7) and (9) can be represented by formula (11). The polyarylene polymer can be sulfonated in the same manner as in the first embodiment.

The sulfonated polyarylene polymer is best suited as a polymer electrolyte membrane for a solid polymer electrolyte fuel cell if unit A is an aromatic compound unit with a benzophenone-4,4'-diyl structure and unit B is an aromatic compound unit derivative from a 4'-phenoxy-2,5-benzophenone structure. In this case it is desirable that unit A constitute 7–35 mol %, and unit B 65–93 mol %. Most suitably, unit A constitutes 8–30 mol %, and unit B 70–92 mol %. It is desirable for the sulfonated polyarylene polymer to have an ion exchange capacity of not less than 1.5 meq/g but not more than 3.0 meq/g, and preferably not less than 1.7 meq/g but not more than 2.5 meg/g.

The ion exchange capacity can be measured by the same method as in the first embodiment and determined in accordance with formula (6). The structure of the sulfonated polyarylene polymer can be confirmed with the aid of infrared absorption spectra or nuclear magnetic resonance (1 H NMR) spectra in the same manner as in the first embodiment.

The composite polymer electrolyte membrane 3 to which the second embodiment of the present invention pertains contains specified proportions of a matrix comprising a sulfonate selected from among polyarylene polymer sulfonates and having an ion exchange capacity of at least 1.5 meq/g but less than 3.0 meq/g, and a reinforcement comprising a sulfonate selected from among sulfonated polyarylene polymers and having an ion exchange capacity of at least 0.5 meq/g but less than 1.5 meq/g.

Should the ion exchange capacity of the sulfonate comprising the matrix be less than 1.5 meq/g, it is impossible to achieve the proton conductivity required for the polymer electrolyte membrane. If on the other hand the ion exchange capacity is in excess of 3.0 meq/g, it is impossible to achieve satisfactory mechanical strength even with the use of a reinforcement. The ion exchange capacity of the sulfonate comprising the matrix is preferably in excess of 1.7 meq/g but less than 2.5 meq/g.

If the sulfonate which forms the reinforcement has an ion exchange capacity of less than 0.5 meq/g, this value is lower than that required for proton conductivity in the polymer electrolyte membrane. If on the other hand the ion exchange capacity of the sulfonate constituting the reinforcement is in excess of 1.5 meq/g, it is incapable of imparting the required mechanical strength to the polymer electrolyte membrane. The ion exchange capacity of the sulfonate comprising the reinforcement is preferably in excess of 0.5 meq/g but less than 1.3 meq/g.

The ion exchange capacities of the matrix and reinforcement can easily be adjusted to within their respective ranges by varying the molar ratio of units A and B to alter the amount of sulfonic acid groups introduced into the sulfonated polyarylene polymer. Alternatively, the same effect can be achieved by using the same sulfonated polyarylene polymer and varying the concentration of fuming sulfuric acid or other sulfonating agent and the reaction time.

In the polymer electrolyte membrane 3 to which the present embodiment pertains, both the matrix and reinforcement are selected from among sulfonated polyarylene polymers. The result in chemical terms is that they easily dissolve into each other, while in physical terms they have similar rates of dilation, so that they do not become detached even with repeated dilation, expansion and contraction under conditions of high temperature and high pressure while the fuel cell is in operation, thus facilitating outstanding performance in generating electricity.

With a view to making it easier to impart the required mechanical strength to the polymer electrolyte membrane 3, it is desirable that the sulfonated polyarylene polymer which constitutes the reinforcement be in the form of fibers or a porous film.

The reinforcement can be fashioned in the form of fibers by dissolving the sulfonated polyarylene polymer uniformly in N-methylpyrrolidone or a similar organic solvent and spinning the resultant solution by the normal method. If the reinforcement is in the form of fibers, they may be either long or short. If long, they may assume the form of either woven or unwoven cloth. In the case of unwoven cloth it is preferable for the fibers to be suitably fused by calendering. In any case it is desirable that the diameter of the sulfonated polyarylene polymer fibers which form the reinforcement is in the range 1–15 $\mu$m. If the diameter is less than 1 $\mu$m, the effect of reinforcement may be insufficient. If on the other hand it is in excess of 15 $\mu$m, the proton conductivity of the composite polymer electrolyte membrane 3 may become uneven.

In order to obtain a reinforcement in the form of a porous film, the sulfonated polyarylene polymer is first dissolved uniformly in N-methylpyrrolidone or a similar organic solvent, after which particles of a layer silicate or similar poorly acid-resistant compound are added to the reinforcement solution and mixed uniformly, the resultant solution cast in a flat mould and heat-dried to yield a film. This film can then be treated with hydrochloric acid or a similar substance to remove the poorly acid-resistant compound to yield a porous film.

If the reinforcement is in the form of a porous film, it is desirable that the porosity rate be approximately 50–80%, with an average pore diameter of around 0.2–3 $\mu$m. If the porosity rate is less than 50% and the average pore diameter less than 0.2 $\mu$m, the proton conductivity of the composite polymer electrolyte membrane may be unsatisfactory. If on the other hand the porosity rate is in excess of 80% and the average pore diameter exceeds 3 $\mu$m, it may prove impossible to attain the effect of reinforcing the composite polymer electrolyte membrane 3. The thickness of the film regulates the mechanical strength and proton conductivity of the composite polymer electrolyte membrane, and is therefore preferably about 30–100 $\mu$m.

In the sulfonated polyarylene polymer which forms the reinforcement, it is desirable that $H^+$ in at least part of the sulfonic acid groups is substituted with $Na^+$. Substituting $H^+$ in the sulfonic acid groups with $Na^+$ serves to enhance adhesion between the matrix and the reinforcement, allowing film resistance in the composite polymer electrolyte membrane 3 to be reduced.

The ratio by weight of the matrix and reinforcement in the composite polymer electrolyte membrane 3 is preferably within the range 2.5:1–1:3. If it is less than 2.5:1, reinforcing and hardening may be insufficient. If on the other hand it is in excess of 1:3, the proton conductivity of the composite polymer electrolyte membrane 3 may be unsatisfactory. It is even more desirable for the ratio by weight of the matrix and reinforcement to be within the range 2:1–1:1.25.

There follows a description of the method of manufacturing the polymer electrolyte membrane 3.

The first step in manufacturing the present embodiment is to synthesize a sulfonated polyarylene polymer with an ion exchange capacity in excess of 1.5 meq/g but less than 3.0 meq/g, and preferably in excess of 1.7 meq/g but less than 2.5 meq/g. This is dissolved in N-methylpyrrolidone or a similar organic solvent to form a uniform solution, which constitutes the matrix solution. From this solution the reinforcement is produced in the form of fibers or a porous film.

Next, a sulfonated polyarylene polymer with an ion exchange capacity in excess of 0.5 meq/g but less than 1.5 meq/g, and preferably in excess of 0.5 meq/g but less than 1.3 meq/g, is synthesized. This is dissolved in N-methylpyrrolidone or a similar organic solvent to form a uniform solution, which constitutes the reinforcement solution. From this solution the reinforcement is produced in the form of fibers or a porous film.

A reinforcement in the form of fibers is manufactured from the reinforcement solution by spinning in the normal manner. The resultant reinforcement is immersed in an aqueous solution of sodium chloride or one containing $Na^+$ with the object of substituting $H^+$ in at least part of the sulfonic acid groups of the sulfonate with $Na^+$. The concentration of the aqueous solution containing $Na^+$ should be in the range 0.01–2mol/liter, and the temperature roughly 25° C. The immersion time is adjusted so that the degree of substitution of $H^+$ with $Na^+$ is in the approximate range 5–50.

Next, the reinforcement manufactured in the above manner in the form of fibers is added to the matrix solution and dispersed uniformly to produce a slurry, which is then cast in a flat mould and dried to yield a composite polymer electrolyte membrane 3 containing a reinforcement in the form of fibers. The reinforcement should constitute 30–70 wt % of the whole composite polymer electrolyte membrane 3.

A reinforcement in the form of a porous film is manufactured from the reinforcement solution by adding to the reinforcement solution particles of a poorly acid-resistant compound such as a layer silicate. After mixing uniformly, the resultant solution is cast in a flat mould and heat-dried to form a film, which is then treated with hydrochloric acid or a similar acid in order to remove the particles of the poorly acid-resistant compound. Alternatively, a foaming agent may be added to the reinforcement solution and mixed uniformly, the resultant solution cast in a flat mould and heat-dried to yield a film. This film can then be foamed by heating while there is a slight residue of organic solvent within it, thus creating a porous structure.

The resultant reinforcement in the form of a porous film is immersed in an aqueous solution of sodium chloride or one containing Na⁺ under the same conditions as the reinforcement in the form of fibers with the object of substituting H⁺ in at least part of the sulfonic acid groups of the sulfonate with Na⁺.

Next, the reinforcement manufactured in the above manner in the form of a porous film is added to the matrix solution and dispersed uniformly to yield a composite polymer electrolyte membrane 3 containing a reinforcement in the form of fibers. The reinforcement should constitute 30–70 wt % of the whole composite polymer electrolyte membrane 3.

There follows a description of a third embodiment of the present invention.

In the solid polymer electrolyte fuel cell employing a polymer electrolyte membrane to which the third embodiment of the present invention pertains, the polymer electrolyte membrane 3 in the structure illustrated in FIG. 1 is replaced with one comprising a single polymer electrode, apart from which the membrane electrode assembly is exactly the same as in the solid polymer electrolyte fuel cell to which the first embodiment pertains.

There follows a description of the structure of the polymer electrolyte membrane 3 to which the third embodiment of the present invention pertains.

The polymer electrolyte membrane 3 to which the third embodiment of the present invention pertains comprises a polymer electrolyte obtained by sulfonating a polyarylene polymer in such a manner that the Q value is in the range 0.09–0.18 C/cm².

The sulfonated polyarylene polymer employed in the polymer electrolyte membrane 3 to which the third embodiment of the present invention pertains comprises an aromatic embodiment unit with an electron-attractive group in its principal chain (hereinafter referred to as 'unit A') and an aromatic compound unit without an electron-attractive group in its principal chain (hereinafter referred to as 'unit B').

Examples of unit A include the same aromatic units represented by general formula (7) as in the first embodiment. —$X^2$— and $R^1$–$R^8$ are exactly the same as in the first embodiment. $R^1$–$R^8$ may be fluorine atoms as such or groups containing fluorine atoms, but in order to reduce manufacturing costs it is desirable that they are not so.

Unit A may also assume various linkages including unit A, as -unit A-O-unit A- or -unit A-O-unit A-O-unit A-, where a plurality of units A is linked by at least one ether bond.

Examples of unit B include at least one of the same aromatic compound units represented by general formulas (8)–(10) as in the first embodiment. $R^9$–$R^{16}$ are exactly the same as in the first embodiment.

The proportion of unit A within the polymer is 5–70 mol %, preferably 7–60 mol %, while the proportion of unit B is 30–95 mol %, preferably 40–93 mol %. If the proportion of unit A is in excess of 70 mol % and that of unit B is less than 30 mol %, the amount of sulfonic acid groups introduced into the polyarylene polymer is insufficient to achieve a Q value in excess of 0.09 C/cm² in an membrane electrode assembly employing a polymer electrolyte membrane formed from a sulfonate of this sort. If on the other hand the proportion of unit A is less than 5 mol % and that of unit B exceeds 95 mol %, the excessive amount of sulfonic acid groups introduced into the polyarylene polymer makes it impossible to achieve a Q value of less than 0.18 C/cm² in an membrane electrode assembly employing a polymer electrolyte membrane formed from a sulfonate of this sort.

The sulfonated polyarylene polymer can be synthesized by copolymerizing a monomer corresponding to the repeated structural unit (unit A) represented by general formula (7) (hereinafter abbreviated to 'monomer A') and at least one monomer corresponding to the repeated structural unit (unit B) selected from the group represented by general formulas (8)–(10) (hereinafter abbreviated to 'monomer B') within a solvent in the presence of a catalyst system including a transition metal compound, then using a sulfonation agent to sulfonate the resultant copolymer.

Examples of monomer A include the same aromatic compounds represented by the general formula (7)' as in the first embodiment. Specific examples of monomer A include the same compounds as in the first embodiment, as are specific examples of monomer A with the structure -unit A-O-unit A.

Monomer A may be a compound which includes a fluorine atom as substitution group, but in order to reduce costs it is preferable that it is not so.

Examples of monomer B include the same aromatic compounds represented by the general formulas (8)'–(10)' as in the first embodiment. Specific examples of monomer B represented by the general formulas (8)'–(10)' include the same compounds as in the first embodiment.

Monomer B may be a compound which includes a fluorine atom as substitution group, but in order to reduce costs it is preferable that it is not so.

Of the examples of monomer B represented by general formulas (8)'–(10)', the most desirable on account of their excellent solubility in the solvent used in the polymerization reaction with monomer A and consequent ease of polymerization are dichlorobenzoic acid derivatives such as 4'-phenoxy-2,5-dichlorobenzophenone, 4'-phenoxy-2,4-dichlorobenzophenone, 4'-phenoxyphenyl-2,5-dichlorobenzoate and 4'-phen-oxyphenyl-2,4-dichlorobenzoate. Of these, 4'-phenoxy-2,5-dichlorobenzophenone is most desirable because when copolymerized in particular with monomer A represented by general formula (7)' it makes it possible to achieve a mechanically strong polymer electrolyte with outstanding properties of creep resistance.

The copolymerization ratio of at least one monomer A represented by general formula (7)' and at least one monomer B selected from the groups of aromatic compounds represented by general formulas (8)'–(10)' is the same as the ratios of units A and B. That is to say, the amount of monomer A used is 5–60 mol %, and preferably 7–50 mol %, while that of monomer B is 40–95 wt %, and preferably 50–93 wt %. However, if unit A is ether-bonded, the ratio of -unit A-O-unit A is 3–40 mol %, and preferably 5–35 mol %.

If compounds represented by general formula (8)' are used as monomer B, excellent solubility of both monomers in the polymerization solution and ease of polymerization are achieved by ensuring that monomer B constitutes preferably no more than 50 mol % of the sum of monomers A and B, and in particular if it constitutes no more than 30 mol %.

If compounds represented by general formula (9)' are used as monomer B, excellent solubility of both monomers in the polymerization solution and ease of polymerization are achieved by ensuring that monomer B constitutes preferably no less than 10 mol % of the sum of monomers A and B, and in particular if it constitutes no less than 20 mol %.

If compounds represented by general formula (10)' are used as monomer B, excellent solubility of both monomers in the polymerization solution and ease of polymerization are achieved by ensuring that monomer B constitutes preferably no more than 50 mol % of the sum of monomers A and B, and in particular if it constitutes no more than 30 mol %.

The polyarylene polymer can be manufactured by copolymerizing monomers A and B under the same polymerization conditions and using the same catalyst system including a transition metal salt and the same solvents as in the first embodiment. The molecular weight of the polyarylene polymer manufactured in this manner is 1,000–1,000,000 as polystyrene conversion weight average molecular weight, and preferably 1,500–200,000. The structure of the polyarylene polymer can be confirmed with the aid of infrared absorption spectra or nuclear magnetic resonance (1 H NMR) spectra in the same manner as in the first embodiment.

For instance, the reaction formula when a monomer A represented by general formula (7)' and a monomer B represented by general formula (9)' are used to produce a polymer comprising repeated structural units (without sulfonic acid groups) represented by general formulas (7) and (9) can be represented by formula (11). The polyarylene polymer can be sulfonated in the same manner as in the first embodiment.

The sulfonated polyarylene polymer is best suited as a polymer electrolyte membrane for a solid polymer electrolyte fuel cell if unit A is an aromatic compound unit with a benzophenone-4,4'-diyl structure and unit B is an aromatic compound unit with a 4'-phenoxy-benzophenone-2,5-diyl structure. In this case it is desirable that unit A constitute 7–35 mol %, and unit B 65–93 mol %. Most suitably, unit A constitutes 8–30 mol %, and unit B 70–92 mol %. It is desirable for the sulfonated polyarylene polymer to have an ion exchange capacity of 1.5–3.0 meq/g.

The ion exchange capacity can be measured by the same method as in the first embodiment and determined in accordance with formula (6). The structure of the sulfonated polyarylene polymer can be confirmed with the aid of infrared absorption spectra or nuclear magnetic resonance (1 H NMR) spectra in the same manner as in the first embodiment.

The composite polymer electrolyte membrane 3 of the third embodiment can be manufactured, for instance, by dissolving the first and second polymer electrolytes separately in organic solvents to produce uniform solutions, then mixing the two solutions, casting the resultant uniform solution in a flat mould and allowing it to dry. Examples of organic solvents include non-proton polar solvents such as dimethyl sulfoxide, N,N-dimethyl formamide, N,N-dimethyl acetamide, N-methylpyrrolidone. The composite polymer electrolyte membrane may also be manufactured by fusion molding.

There follow a number of working and comparative examples.

Working Examples 1–18 with Comparative Examples 1–2 correspond to the first embodiment of the present invention, Working Examples 19–24 with Comparative Examples 3–5 to the second embodiment, and Working Examples 25–28 with Comparative Examples 6–7 to the third embodiment.

WORKING EXAMPLES 1–6, COMPARATIVE EXAMPLES 1

The polyarylene polymer employed was poly(4'-phenoxybenzoyl-1,4-phenylene) represented by formula (12), which was sulfonated with the aid of concentrated sulfuric acid to yield a first polymer electrolyte. The ion exchange capacity of the resultant sulfonated poly(4'-phenoxybenzoyl-1,4-phenylene) was 2.2 meg/g.

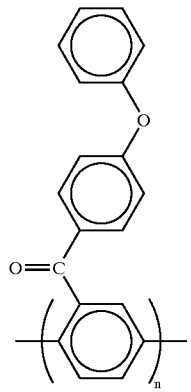

(12)

Next, polyether ether ketone (PEEK) was sulfonated by the same method as the first polymer electrolyte to yield sulfonated polyether ether ketone as the second polymer electrolyte. The ion exchange capacity of the resultant sulfonated polyether ether ketone was 1.8 meg/g.

Then, the sulfonated poly(4'-phenoxybenzoyl-1,4-phenylene) and sulfonated polyether ether ketone were each dissolved separately in N-methylpyrrolidone, after which the two solutions were mixed in solid weight ratios varying from 100:0 to 60:40 to produce a plurality of polymer electrolyte solutions. These were each cast in flat moulds and dried to yield composite polymer electrolyte membranes 3 with a dry thickness of 50 μm.

The composite polymer electrolyte membranes 3 were next held between an oxygen electrode 1 and fuel electrode 2 as in FIG. 1, and hot-pressed initially at 80° C., 5 MPa for two minutes, then at 160° C., 4 MPa for one minute to create a solid polymer electrolyte fuel cell.

The oxygen electrode 1 and fuel electrode 2 were produced in the following manner. To begin with, carbon black and polytetrafluoroethylene (PTFE) particles were mixed in a ratio of 4:6 by weight. The mixture was then dispersed uniformly in ethylene glycol to yield a slurry, which was coated on to one side of a sheet of carbon paper 6 and dried to form an underlayer 7. The carbon paper 6 and underlayer 7 together constituted a gas-diffusion layer 4.

Next, catalyst particles obtained by supporting particles of platinum on carbon black (furnace black) in a ratio of 1:1 were dispersed uniformly in a ratio of 8:5 by weight in a sulfonated fluorine high-molecular compound (Nafion (product name), DuPont) acting as an ion conducting material, thus creating a catalyst paste. It should be noted that for the purpose of the present working example a sulfonated fluorine high-molecular compound was used as an ion conducting material, but a polymer electrolyte solution may also be used.

The catalyst paste was screen-printed on to the underlayer 7 of the gas-diffusion layer 4 so as to give a platinum volume of 0.5 mg/cm$^2$, and this was dried first at 60° C. for ten minutes and then under reduced pressure at 120° C. to produce the oxygen electrode 1 and fuel electrode 2.

Then, the electric charge per unit area of the membrane electrode assembly (Q value), generated potential and resistance to hot water of the solid polymer electrolyte fuel cells employing the composite polymer electrolyte membrane 3 were measured, and their performance compared.

(1) Measuring the Q Value

Figure 2:
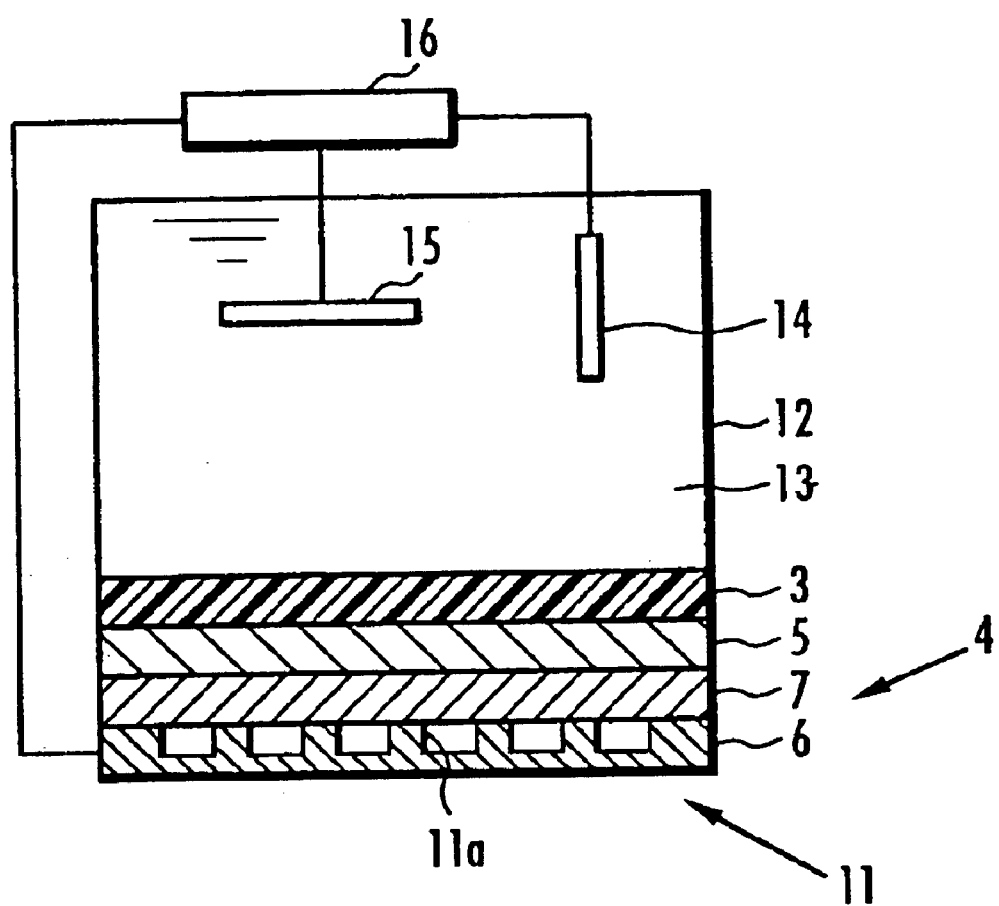
FIG. 2 is an explanatory diagram illustrating the configuration of a device for measuring the amount of electric charge per unit area of the membrane electrode assembly.

The device illustrated in FIG. 2 is used to measure the Q value. In this device a composite polymer electrolyte membrane 3 has an electrode 11 of the same structure as the oxygen electrode 1 and fuel electrode 2 on one side only. This is positioned at the bottom of a tank 12 containing an aqueous solution of sulfuric acid 13 with a pH value of 1 in such a manner that the acid comes into contact with the polymer electrolyte membrane 3 of the electrode 11. The device illustrated in FIG. 2 has a reference electrode 14 and control electrode 15 immersed within the aqueous solution of sulfuric acid 13. The reference electrode 14, control electrode 15 and gas-diffusion layer 4 of the electrode 11 are each connected to a potentiostat 16. The electrode 11 is provided with a gas passage 11a corresponding to the oxygen passage 1a or fuel passage 2a illustrated in FIG. 1, and is structured so as to come into contact freely with nitrogen gas delivered through the gas passage 11a.

If in the device illustrated in FIG. 2 the potentiostat 16 is used to apply voltage between the gas-diffusion layer 4 and the sulfuric acid solution 13, protons from the sulfuric acid solution 13 permeate through the polymer electrolyte membrane 3 to reach the electrode 11, transferring electrons. In other words, when the protons come into contact with platinum surfaces within the catalytic layer 7, electrons are passed from the platinum to the protons. It should be noted that in the device illustrated in FIG. 2 the platinum content of the catalytic layer 7 within the electrode 11 is 0.5 g/cm$^2$.

Meanwhile, if reverse voltage is applied, electrons are passed from adsorbed hydrogen atoms to the platinum and are diffused as protons into the sulfuric acid solution.

Figure 3:
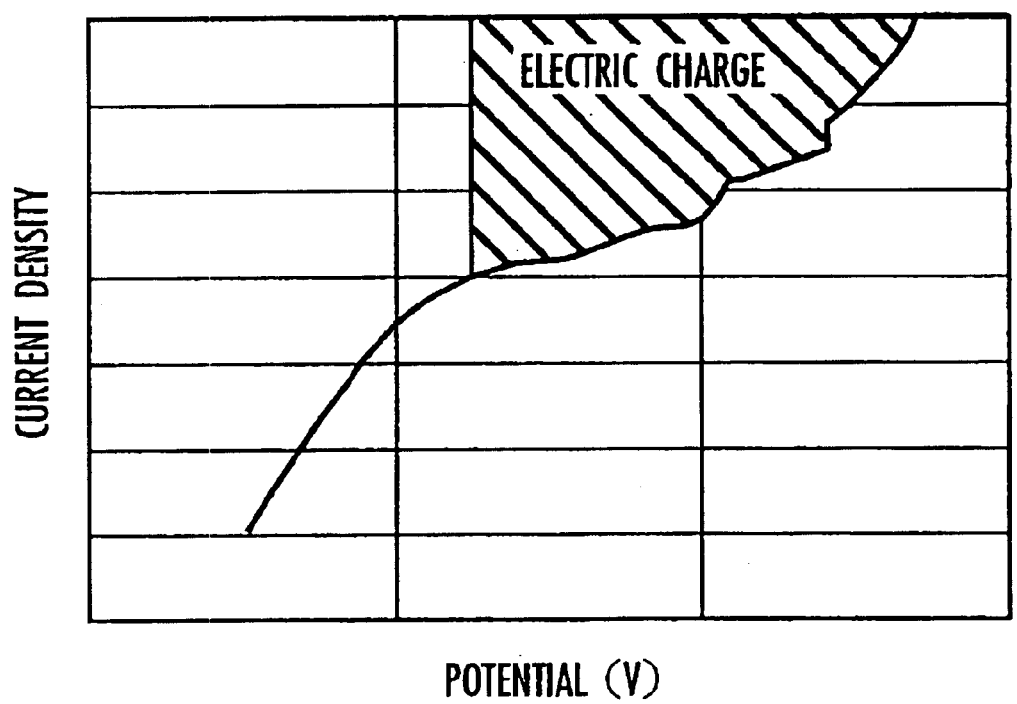
FIG. 3 is a graph showing a sample measurement of the amount of electric charge per unit area of the electrode with the aid of the device illustrated in FIG. 2.

If the voltage is changed continuously between −0.5 V and 1 V, it is possible to determine the Q value from the peak area on the proton adsorption side, as FIG. 3 demonstrates. Here, the Q value represents the electric charge (C/cm$^2$) per unit area of the electrode 11, and provides an index of adhesion between the electrode and the polymer electrolyte membrane, whereby the higher the Q value the greater the degree of adhesion.

(2) Measuring Generated Potential

A single solid polymer electrolyte fuel cell was used to generate electricity by delivering air to the oxygen electrode 1 and purified water to the fuel electrode 2. The cell potential was measured at a current density of 0.2 A/cm$^2$. The generating conditions were the same for both poles: pressure 100 kPa, utilization rate 50%, relative humidity 50%, temperature 85° C.

(3) Measuring Resistance to Hot Water

The solid polymer electrolyte fuel cell was immersed in hot water at 95° C. for 200 hours, the ion exchange capacity X (meq/g) measured against the initial ion exchange capacity Y (meq/g), and resistance to hot water calculated with the aid of the formula (X/Y)×100 (%).

Table 1 shows the Q value, generated potential and resistance to hot water of solid polymer electrolyte fuel cells using the polymer electrolyte membrane 3.

TABLE 1

|  | Ratio by weight | Q value (C/cm$^2$) | Generated potential (V) | Resistance to hot water (%) |
| --- | --- | --- | --- | --- |
| Comparative Example 1 | 100:0 | 0.09 | 0.72 | 83 |
| Working example 1 | 95:5 | 0.14 | 0.77 | 81 |
| Working example 2 | 90:10 | 0.15 | 0.81 | 76 |
| Working example 3 | 85:15 | 0.17 | 0.82 | 69 |
| Working example 4 | 80:20 | 0.17 | 0.82 | 66 |
| Working example 5 | 70:30 | 0.19 | 0.82 | 63 |
| Working example 6 | 60:40 | 0.19 | 0.82 | 35 |

Ratio by weight = First polymer electrolyte:Second polymer electrolyte

As is clear from Table 1, a solid polymer electrolyte fuel cell employing a composite polymer electrolyte membrane 3 whereof the first polymer electrolyte constitutes 60–95 wt % of the whole and the second polymer electrolyte 5–40 wt % of the whole (Working examples 1–6) has a higher Q value and exhibits superior adhesion to a solid polymer electrolyte fuel cell which comprises only a first polymer electrolyte and does not include a second (Comparative Example 1). Moreover, it is clear that the solid polymer electrolyte fuel cells of Working examples 1–6 exhibit amply satisfactory performance in terms of generated potential and resistance to hot water.

WORKING EXAMPLES 7–12, COMPARATIVE EXAMPLE 2

To begin with, 4,4'-dichlorobenzophenone as monomer A corresponding to the aromatic compound unit with an electron-attractive group in its principal chain and 2,5-dichloro-4-phenoxybenzophenone as monomer B corresponding to the aromatic compound unit without an electron-attractive group in its principal chain were dissolved in N-methylpyrrolidone in a molar ratio of 1:9. The resultant solution was fed together with a catalyst system comprising sodium iodide, bistriphenylphosphinenickel dichloride, triphenylphosphine and zinc into a three-necked flask which was fitted with a reflux pipe and three-way stopcock, the air within the flask having been replaced with nitrogen. Monomers A and B were heated together inside the three-necked flask in a nitrogen environment within an oil bath at 70° C. to polymerize them. The composition of the catalyst system in relation to the sum total of monomers A and B was 13 mol % sodium iodide, 3 mol % bistriphenylphosphinenickel dichloride, 40 mol % triphenylphosphine and 240 mol % zinc.

When 20 hours had elapsed from the start of the reaction, the polymerization reaction solution was diluted with N-methylpyrrolidone, then poured into a 1:10 mixed solution of hydrochloric acid and methanol to precipitate the polymer. This was washed, filtered and vacuum-dried to yield a white-colored powder. The weight-average molecular weight of the polymer was 160,000.

Concentrated sulfuric acid was added to the polymer which had been obtained in the polymerization reaction, and it was sulfonated by stirring for 24 hours at room temperature. When the reaction was complete, the reaction solution was poured into a large volume of purified water to precipitate the sulfonated polymer. It was washed continuously with water until it attained a pH value of 7, after which it was filtered and the sulfonated polymer retrieved. This was vacuum-dried at 90° C. to produce the first polymer electrolyte, which infrared absorption and nuclear magnetic resonance spectra showed to be sulfonated (4'-phenoxybenzophenone-2,5'-diyl) (benzophenone-4,4'-diyl) as represented by formula (13) below. Its ion exchange capacity was 2.2 meq/g.

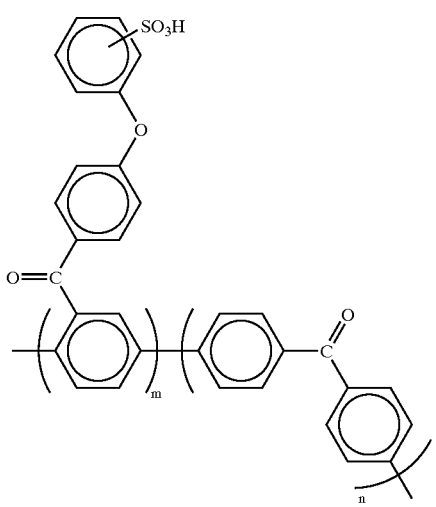

(13)

It should be noted that formula (13) represents a random copolymer in which a (4'-phenoxybenzophenone-2,5'-diyl) structure and a (benzophenone-4,4'-diyl) structure have been copolymerized in a ratio of m:n, and does not signify a block copolymer of m (4'-phenoxybenzophenone-2,5'-diyl) structures and n (benzophenone-4,4'-diyl) structures.

Next, a polyether ether ketone (PEEK) was sulfonated by the same method as the first polymer electrolyte to produce a sulfonated polyether ether ketone as the second polymer electrolyte. The ion exchange capacity of the resultant sulfonated polyether ether ketone was 1.8 meq/g.

The sulfonated (4'-phenoxybenzophenone-2,5'-diyl)(benzophenone-4,4'-diyl) and sulfonated polyether ether ketone were dissolved separately in N-methyl-pyrrolidone, pyrrolidone, after which the two solutions were mixed in solid weight ratios varying from 100:0 to 60:40 to produce a plurality of polymer electrolyte solutions. These were each cast in flat moulds and dried to yield composite polymer electrolyte membranes 3 with a dry thickness of 50 μm.

Solid polymer electrolyte fuel cells were manufactured in exactly the same manner as in Working examples 1–6 except for the use of different composite polymer electrolyte membranes 3. The electric charge per unit area of the membrane electrode assembly (Q value), generated potential and resistance to hot water of the solid polymer electrolyte fuel cells employing the composite polymer electrolyte membrane 3 were measured in exactly the same manner as in Working examples 1–6, and their performance compared. The results are shown in Table 2.

TABLE 2

| | Ratio by weight | Q value (C/cm$^2$) | Generated potential (V) | Resistance to hot water (%) |
|---|---|---|---|---|
| Comparative Example 2 | 100:0 | 0.09 | 0.72 | 82 |
| Working example 7 | 95:5 | 0.14 | 0.81 | 80 |
| Working example 8 | 90:10 | 0.15 | 0.81 | 75 |
| Working example 9 | 85:15 | 0.17 | 0.82 | 70 |
| Working example 10 | 80:20 | 0.17 | 0.82 | 70 |
| Working example 11 | 70:30 | 0.19 | 0.82 | 65 |
| Working example 12 | 60:40 | 0.19 | 0.82 | 40 |

Ratio by weight = First polymer electrolyte:Second polymer electrolyte

As is clear from Table 2, a solid polymer electrolyte fuel cell employing a composite polymer electrolyte membrane 3 whereof the first polymer electrolyte constitutes 60–95 wt % of the whole and the second polymer electrolyte 5–40 wt % of the whole (Working examples 7–12) has a higher Q value and exhibits superior adhesion to a solid polymer electrolyte fuel cell which comprises only a first polymer electrolyte and does not include a second (Comparative Example 2). Moreover, it is clear that the solid polymer electrolyte fuel cells of Working Examples 7–12 exhibit amply satisfactory performance in terms of generated potential and resistance to hot water.

WORKING EXAMPLES 13–15

Next, 5–15 mol 4,4'-dichlorobenzophenone as monomer A constituting the first polymer electrolyte was used with 85–95 mol 2,5-dichloro-4-phenoxybenzophenone as monomer B to manufacture composite polymer electrolyte membranes 3 in exactly the same manner as in Working examples 7–12 except that the molar ratio of the constituents of the first polymer electrolyte was varied, and the ratio by weight of the first polymer electrolyte to the second was 85:15.

Solid polymer electrolyte fuel cells were manufactured in exactly the same manner as in Working Examples 1–6 except for the use of different composite polymer electrolyte membranes 3. The electric charge per unit area of the membrane electrode assembly (Q value), generated potential and resistance to hot water of the solid polymer electrolyte fuel cells employing the composite polymer electrolyte membrane 3 were measured in exactly the same manner as in Working Examples 1–6, and their performance compared. The results are shown in Table 3.

TABLE 3

| | Molar ratio | Q value (C/cm$^2$) | Generated potential (V) | Resistance to hot water (%) |
|---|---|---|---|---|
| Working example 13 | 5:95 | 0.17 | 0.84 | 40 |
| Working example 14 | 10:90 | 0.17 | 0.82 | 70 |
| Working example 15 | 15:85 | 0.17 | 0.82 | 70 |

Molar ratio = Monomer A:Monomer B

As is clear from Table 3, a solid polymer electrolyte fuel cell (Working examples 13–15) employing a composite polymer electrolyte membrane 3 which comprises 4,4'-dichloro-benzophenone as monomer A and 2,5-dichloro-4-phenoxybenzophenone as monomer B in the aforesaid ratios exhibits the same performance as Working examples 7–12. It should be noted that Working example 14 has the same structure as Working example 8.

WORKING EXAMPLES 16–18

Next, 2–15 mol 4,4'-bis(4-chlorobenzoyl)diphenylether was used in place of 4,4'-dichlorobenzophenone as monomer A constituting the first polymer electrolyte with 85–98 mol 2,5-dichloro-4-phenoxybenzophenone as monomer B to manufacture composite polymer electrolyte membranes 3 in exactly the same manner as in Working examples 7–12 except that the molar ratio of the constituents of the first polymer electrolyte was varied, and the ratio by weight of the first polymer electrolyte to the second was 85:15.

Solid polymer electrolyte fuel cells were manufactured in exactly the same manner as in Working examples 1–6 except for the use of different composite polymer electrolyte membranes 3. The electric charge per unit area of the membrane electrode assembly (Q value), generated potential and resistance to hot water of the solid polymer electrolyte fuel cells employing the composite polymer electrolyte membrane 3 were measured in exactly the same manner as in Working examples 1–6, and their performance compared. The results are shown in Table 4.

TABLE 4

|  | Molar ratio | Q value (C/cm$^2$) | Generated potential (V) | Resistance to hot water (%) |
|---|---|---|---|---|
| Working example 16 | 2:98 | 0.18 | 0.85 | 35 |
| Working example 17 | 10:90 | 0.18 | 0.81 | 70 |
| Working example 18 | 15:85 | 0.18 | 0.82 | 70 |

Molar ratio = Monomer A:Monomer B

As is clear from Table 4, a solid polymer electrolyte fuel cell (Working examples 16–18) employing a composite polymer electrolyte membrane 3 which comprises 4,4'-bis (4-chlorobenzoyl) diphenylether as monomer A and 2,5-dichloro-4-phenoxybenzophenone as monomer B in the aforesaid ratios exhibits the same performance as Working examples 7–12.

It should be noted that in these working examples sulfonated polyether ether ketone was employed as the second polymer electrolyte, but it may be replaced with sulfonated polyphenylene oxide or sulfonated polyether sulfone with the same results.

Furthermore, 4,4'-bis(4-chlorobenzoyl)diphenylether was employed as monomer A constituting the first polymer electrolyte in Working examples 16–18, but this maybe replaced with 3,4'-bis(4-chlorobenzoylamino)diphenylether with the same results.

WORKING EXAMPLE 19

To begin with, 4,4'-dichlorobenzophenone as monomer A corresponding to the aromatic compound unit with an electron-attractive group in its principal chain and 2,5-dichloro-4-phenoxybenzophenone as monomer B corresponding to the aromatic compound unit without an electron-attractive group in its principal chain were dissolved in N-methylpyrrolidone in a molar ratio of 1:9. The resultant solution was fed together with a catalyst system comprising sodium iodide, bistriphenylphosphinenickel dichloride, triphenylphosphine and zinc into a three-necked flask which was fitted with a reflux pipe and three-way stopcock, the air within the flask having been replaced with nitrogen. Monomers A and B were heated together inside the three-necked flask in a nitrogen environment within an oil bath at 70° C. to polymerize them. The composition of the catalyst system in relation to the sum total of monomers A and B was 13 mol % sodium iodide, 3 mol % bistriphenylphosphinenickel dichloride, 40 mol % triphenylphosphine and 240 mol % zinc.

When 20 hours had elapsed from the start of the reaction, the polymerization reaction solution was diluted with N-methylpyrrolidone, then poured into a 1:10 mixed solution of hydrochloric acid and methanol to precipitate the polymer. This was washed, filtered and vacuum-dried to yield a white-colored powder. The weight-average molecular weight of the polymer was 160,000.

Concentrated sulfuric acid was added to the polymer which had been obtained in the polymerization reaction, and it was sulfonated by stirring for 24 hours at room temperature. When the reaction was complete, the reaction solution was poured into a large volume of purified water to precipitate the sulfonated polymer. It was washed continuously with water until it attained a pH value of 5, after which it was filtered and the sulfonated polymer retrieved. This was dried in hot air at 90° C. to produce a polymer electrolyte, which was shown by infrared absorption and nuclear magnetic resonance spectra to be sulfonated (4'-phenoxybenzophenone-2,5'-diyl) (benzophenone-4,4'-diyl) as represented by formula (13).

In this working example, sulfonated (4'-phenoxybenzophenone-2,5'-diyl) (benzophenone-4,4'-diyl) with ion exchange capacities of 1.5 meq/g and 1.0 meq/g was obtained by adjusting the sulfonation conditions.

Next, sulfonated (4'-phenoxybenzophenone-2,5'-diyl) (benzophenone-4,4'-diyl) with an ion exchange capacity of 1.5 meq/g was mixed with N-methylpyrrolidone in a ratio by weight of 95:5 to form a matrix solution having a sulfonated (4'-phenoxybenzophenone-2,5'-diyl)(benzo-phenone4,4'-diyl) concentration of 10 wt % in relation to the whole.

Then, sulfonated (4'-phenoxybenzophenone-2,5'-diyl) (benzophenone-4,4'-diyl) with an ion exchange capacity of 1.0 meq/g was mixed with N-methylpyrrolidone in a ratio by weight of 10:90 to form a reinforcement solution having a sulfonated (4'-phenoxybenzophenone-2,5'-diyl)(benzophenone4,4'-diyl) concentration of 10 wt % in relation to the whole.

The reinforcement solution was used to spin a reinforcement in the form of fibers with a mean diameter of 5 μm. The resultant reinforcement was immersed in a 2 mol/liter aqueous solution of sodium chloride at 25° C. for 30 minutes to substitute H$^+$ in part of the sulfonic acid groups in the sulfonated (4'-phenoxybenzophenone-2,5'-diyl) (benzophenone4,4'-diyl) with Na$^+$.

Next, the reinforcement in the form of fibers in which H$^+$ in part of the sulfonic acid groups had been substituted with Na$^+$ was dispersed uniformly in the matrix solution to form a slurry. In the slurry the ratio by weight of solids within the matrix solution to the reinforcement in the form of fibers was 90:10.

The slurry was cast in a flat mould and dried to produce a composite polymer electrolyte membrane 3 containing the reinforcement in the form of fibers and having a dry thickness of 50 μm.

The electric charge per unit area of the membrane electrode assembly (Q value) and generated potential were measured in the composite polymer electrolyte membrane 3 obtained in the present embodiment in the same manner as in Working examples 1–6, in addition to which its tensile strength was measured in accordance with the method stipulated in JIS K7127. This was taken as its mechanical strength. The results of measuring the Q value, generated potential and mechanical strength are shown in Table 5.

WORKING EXAMPLE 20

Particles of a poorly acid-resistant layer silicate were added to the same reinforcement solution as in Working example 19, and mixed uniformly. The resultant solution was cast in a flat mould and heat-dried to form a film, which was treated with hydrochloric acid or a similar acid to remove the particles of a poorly acid-resistant layer silicate and produce a porous film. The reinforcement in the form of a porous film was immersed in the same matrix solution as in Working example 19 to yield a composite polymer electrolyte membrane 3 containing a reinforcement in the form of a porous film. Apart from this, a composite polymer electrolyte membrane 3 with a dry thickness of 50 μm was manufactured in exactly the same manner as Working example 19.

The porosity rate of the reinforcement in the form of a porous film was 65%, the average pore diameter 10 μm, and the film thickness 30 μm.

The Q value, generated potential and mechanical strength of the composite polymer electrolyte membrane 3 were measured in exactly the same manner as Working example 19, and are shown in Table 5.

WORKING EXAMPLE 21

A composite polymer electrolyte membrane 3 with a dry thickness of 50 μm was manufactured in exactly the same manner as Working example 19 except that there was no substitution whatsoever of $H^+$ in the sulfonic acid groups in the sulfonated (4'-phenoxybenzophenone-2,5'-diyl) (benzophenone-4,4'-diyl) with $Na^+$.

The Q value, generated potential and mechanical strength of the composite polymer electrolyte membrane 3 obtained in this working example were measured in exactly the same manner as Working example 19, and are shown in Table 5.

WORKING EXAMPLE 22

A composite polymer electrolyte membrane 3 with a dry thickness of 50 μm was manufactured in exactly the same manner as Working example 20 except that there was no substitution whatsoever of $H^+$ in the sulfonic acid groups in the sulfonated (4'-phenoxybenzophenone-2,5'-diyl) (benzophenone-4,4'-diyl) with $Na^+$.

The Q value, generated potential and mechanical strength of the composite polymer electrolyte membrane 3 obtained in this working example were measured in exactly the same manner as Working example 19, and are shown in Table 5.

WORKING EXAMPLE 23

A composite polymer electrolyte membrane 3 with a dry thickness of 50 μm was manufactured in exactly the same manner as Working example 19 except that the 4,4'-dichlorobenzophenone used as monomer A in Working example 19 was replaced with 4,4'-bis (4-chlorobenzoyl) diphenylether.

The Q value and generated potential of the composite polymer electrolyte membrane 3 obtained in this working example were measured in exactly the same manner as Working example 19. It should be noted that measurement of mechanical strength was omitted. The results of the measurements are shown in Table 5.

WORKING EXAMPLE 24

A composite polymer electrolyte membrane 3 with a dry thickness of 50 μm was manufactured in exactly the same manner as Working example 20 except that the 4,4'-dichlorobenzophenone used as monomer A in Working Example 19 was replaced with 4,4'-bis (4-chlorobenzoyl) diphenylether.

The Q value and generated potential of the composite polymer electrolyte membrane 3 obtained in this working example were measured in exactly the same manner as Working example 19. It should be noted that measurement of mechanical strength was omitted. The results of the measurements are shown in Table 5.

COMPARATIVE EXAMPLE 3

A slurry was prepared by dispersing polytetrafluoroethylene (PTFE) fibers with a diameter of 5 μm into a matrix solution of styrene and divinylbenzene in a partly copolymerized state wherein the ratio of styrene to divinylbenzene was 20:1. The ratio by weight of solids within the matrix solution to PTFE fibers was 90:10. It should be added that this solution of styrene and divinylbenzene in a partly copolymerized state is the raw material of an ion-exchange resin.

The slurry was cast in a flat mould and dried to produce a composite polymer electrolyte membrane containing PTFE fibers and having a thickness of 50 μm.

The Q value and generated potential and mechanical strength of the composite polymer electrolyte membrane obtained in this working example were measured in exactly the same manner as Working example 19, and the results shown in Table 5.

COMPARATIVE EXAMPLE 4

Two 8 cm×8 cm sheets of PTFE stretched porous film with a thickness of 15 μm and a porosity rate of 70% were prepared, and a 6 cm×6 cm window created in the center of one of them. Each of the sheets was stuck on to an 8 cm×8 cm sheet of glass, which they were laid on top of each other with the stretched porous film sides facing, and a gap of 55 μm. With the stretched porous film held in this manner between two sheets of glass, the same solution of styrene and divinylbenzene in a partly copolymerized state as was used in Comparative Example 3 was injected into the window in the stretched porous film, in which state copolymerization was completed.

The glass was removed and the ion exchange resin comprising a copolymer of styrene and divinylbenzene sulfonated with the aid of fuming sulfuric acid to yield a composite polymer electrolyte membrane with a dry thickness of 50 μm wherein the ion exchange resin is supported within the pores of a stretched porous film.

The Q value and generated potential and mechanical strength of the composite polymer electrolyte membrane obtained in this comparative exmaple were measured in exactly the same manner as Working Example 19, and the results shown in Table 5.

COMPARATIVE EXAMPLE 5

A composite polymer electrolyte membrane containing PTFE fibers and having a dry thickness of 50 μm was manufactured in exactly the same manner as Working example 19 except that the reinformcement in the form of fibers comprising sulfonated (4'-phenoxybenzophenone-2, 5'-diyl)(benzophenone-4,4'-diyl) used in Working example 19 was replaced with the same PTFE fibers as were used in Comparative Example 3.

The Q value and generated potential and mechanical strength of the composite polymer electrolyte membrane obtained in this working example were measured in exactly the same manner as Working example 19, and the results shown in Table 5.

TABLE 5

|  | Q value (C/cm²) | Generated potential (V) | Tensile force (MPa) |
|---|---|---|---|
| Working example 19 | 0.17 | 0.82 | 61 |
| Working example 20 | 0.14 | 0.79 | 59 |
| Working example 21 | 0.16 | 0.79 | 48 |
| Working example 22 | 0.13 | 0.77 | 45 |
| Working example 23 | 0.18 | 0.81 | Not measured |

TABLE 5-continued

|  | Q value (C/cm²) | Generated potential (V) | Tensile force (MPa) |
|---|---|---|---|
| Working example 24 | 0.16 | 0.81 | Not measured |
| Comparative Example 3 | 0.06 | 0.64 | 34 |
| Comparative Example 4 | 0.09 | 0.62 | 36 |
| Comparative Example 5 | 0.07 | 0.69 | 36 |

As is clear from Table 5, a composite polymer electrolyte membrane wherein both the matrix and the reinforcement comprise sulfonated (4'-phenoxybenzophenone-2,5'-diyl)(benzophenone-4,4'-diyl) (Working examples 19–24) exhibits higher potential and better adhesion between matrix and reinforcement even after repeated exposure to high and low temperatures than one wherein matrix (ion exchange resin) and reinforcement comprise different materials (Comparative Examples 3–5). It is also clear that the composite polymer electrolyte membranes of Working Examples 19–24 are superior to those of Comparative Examples 3–5 in terms of Q value, tensile strength, adhesion to the electrodes and mechanical strength.

WORKING EXAMPLES 25–28, COMPARATIVE EXAMPLES 6–7

To begin with, 4,4'-dichlorobenzophenone as monomer A corresponding to the aromatic compound unit with an electron-attractive group in its principal chain and 2,5-dichloro-4phenoxybenzophenone as monomer B corresponding to the aromatic compound unit without an electron-attractive group in its principal chain were dissolved in N-methylpyrrolidone in a molar ratio of 1:9. The resultant solution was fed together with a catalyst system comprising sodium iodide, bistriphenylphosphinenickel dichloride, triphenylphosphine and zinc into a three-necked flask which was fitted with a reflux pipe and three-way stopcock, the air within the flask having been replaced with nitrogen. Monomers A and B were heated together inside the three-necked flask in a nitrogen environment within an oil bath at 70° C. to polymerize them. The composition of the catalyst system in relation to the sum total of monomers A and B was 13 mol % sodium iodide, 3 mol % bistriphenylphosphinenickel dichloride, 40 mol % triphenylphosphine and 240 mol % zinc.

When 20 hours had elapsed from the start of the reaction, the polymerization reaction solution was diluted with N-methylpyrrolidone, then poured into a 1:10 mixed solution of hydrochloric acid and methanol to precipitate the polymer. This was washed, filtered and vacuum-dried to yield a white-colored powder. The weight-average molecular weight of the polymer was 160,000.

Concentrated sulfuric acid was added to the polymer which had been obtained in the polymerization reaction, and it was sulfonated by stirring for between several hours and several tens of hours at room temperature. When the reaction was complete, the reaction solution was poured into a large volume of purified water to precipitate the sulfonated polymer. It was washed continuously with water until it attained a pH value of 7, after which it was filtered and the sulfonated polymer retrieved. This was vacuum dried at 90° C. to produce a polymer electrolyte, which was shown by infrared absorption and nuclear magnetic resonance spectra to be sulfonated (4'-phenoxybenzophenone-2,5'-diyl)(benzophenone-4,4'-diyl) copolymer as represented by formula (13).

The ion exchange capacity of the resultant sulfonated (4'-phenoxybenzophenone-2,5'-diyl)(benzophenone-4,4'-diyl) copolymer varied according to the sulfonation reaction time, but was within the range 1.5–3.0 meq/g.

Next, sulfonated (4'-phenoxybenzophenone-2,5'-diyl)(benzophenone-4,4'-diyl) copolymers and N-methylpyrrolidone were mixed uniformly in a ratio by weight of 92:2 to form sulfonated (4'-phenoxybenzophenone-2,5'-diyl) (benzophenone4,4'-diyl) copolymer solutions, which were each cast in flat moulds and dried to yield polymer electrolyte membranes 3. Each of the polymer electrolyte membranes 3 had a dry thickness of 50 μm.

The polymer electrode membranes 3 were then each held between an oxygen electrode 1 and a fuel electrode 2 as illustrated in FIG. 1, and hot-pressed several times for two minutes a time at 80–180° C., 5 MPa. Apart from this, membrane electrode assemblies were manufactured in exactly the same manner as Working Examples 1–6.

The electric charge per unit area of the membrane electrode assembly (Q value) and generated potential were measured in the membrane electrode assemblies manufactured using the polymer electrolyte membranes 3 in the same manner as in Working Examples 1–6.

Next, the performance of six membrane electrode assemblies with Q values measured as above of 0.05 C/cm² (Comparative Example 16), 0.09 C/cm² (Working Example 25), 0.12 C/cm² (Working Example 26), 0.14 C/cm² (Working Example 27), 0.18 C/cm² (Working Example 28) and 0.20 C/cm² (Comparative Example 7) was compared by measuring generated potential and failure rate as explained below.

(1) Measuring Generated Potential

A single solid polymer electrolyte fuel cell was used to generate electricity by delivering air to the oxygen electrode 1 and pure hydrogen to the fuel electrode 2. The cell potential was measured at a current density of 0.2 A/cm². The generating conditions were the same for both electrodes: pressure 100 kPa, utilization rate 50%, relative humidity 50%, temperature 85° C.

(2) Measuring Failure Rate

A single membrane electrode assembly was used. Helium gas was introduced into one electrode at a pressure of 0.5 kPa. If part of the polyarylene polymer structure underwent thermal decomposition and pin holes or other faults occur, the helium gas will leak to the other electrode through the fault. The volume of helium gas leaking to the other electrode was measured, and the membrane electrode assembly was deemed faulty if this was 0.1 mL/cm² min or above. Each batch of 100 membrane electrode assemblies was tested for the presence or absence of failures, and the failure rate was calculated according to the following formula.

Failure rate (%)=(Number of faulty items/Total number of items)×100

Failure rate was measured after the membrane electrode assemblies had been kept at 120° C. for three hours in order to investigate heat resistance.

The results of the measurements of each membrane electrode assembly are shown in Table 6.

TABLE 6

| | Q value (C/cm²) | Generated potential (V) | Failure rate (%) |
|---|---|---|---|
| Comparative Example 6 | 0.05 | 0.62 | Less than 1 |
| Working Example 25 | 0.09 | 0.71 | Less than 1 |
| Working Example 26 | 1.12 | 0.79 | Less than 1 |
| Working Example 27 | 1.14 | 0.81 | Less than 1 |
| Working Example 28 | 1.18 | 0.80 | Less than 1 |
| Comparative Example 7 | 1.20 | 0.82 | 11 |

As is clear from Table 6, the membrane electrode assemblies of Working Examples 25–28 where the Q value was in the range 0.09–0.18 C/cm² exhibited higher generated potential than that of Comparative Example 6 where the Q value was less than 0.09 C/cm². Meanwhile, the membrane electrode assembly of Comparative Example 7 where the Q value was in excess of 0.18 C/cm² apparently exhibited a higher generated potential than those of Working Examples 25–28, but the rate of failure was markedly higher than in the case of Working Examples 25–28, and it is clear that the polymer structure of the polymer electrolyte membrane was undergoing thermal decomposition.

What is claimed is:

1. A composite polymer electrolyte membrane comprising a mixture of at least two types of polymer electrolyte including a first polymer electrolyte and a second polymer electrolyte, wherein:
    the first polymer electrolyte comprises a sulfonated polyarylene polymer and constitutes 50–95 wt % of the electrolyte membrane, and the second polymer electrolyte comprises a hydrocarbon polymer electrolyte other than the sulfonated polyarylene polymer which is the first polymer electrolyte, wherein the first polymer electrolyte and the second polymer electrolyte have different skeleton structures from each other, and
    the first polymer electrolyte comprises a sulfonated polyarylene polymer comprising an aromatic compound repeating unit with an electron-attractive group in the principal chain thereof and an aromatic compound repeating unit without an electron-attractive group in the principal chain thereof.

2. A composite polymer electrolyte membrane according to claim 1, wherein the first polymer electrolyte comprises a sulfonated polyarylene polymer whereof 2–70 mol % comprises an aromatic compound unit with an electron-attractive group in its principal chain, and 30–98 mol % comprises an aromatic compound unit without an electron-attractive group in its principal chain.

3. A composite polymer electrolyte membrane according to claim 2, wherein the electron-attractive group comprises one or more bivalent electron-attractive groups selected from among —CO—, —CONH—, —(CF$_2$)$_p$— (where p is an integer between 1 and 10), —C(CF$_3$)$_2$—, —COO—, —SO— and —SO$_2$—.

4. A composite polymer electrolyte membrane according to claim 2, wherein the first polymer electrolyte constitutes 70–95 wt % of the whole membrane.

5. A composite polymer electrolyte membrane according to claim 2, wherein the first polymer electrolyte comprises a sulfonated polyarylene polymer whereof 7–35 mol % comprises an aromatic compound unit having a benzophenone-4,4'-diyl structure as the aromatic compound unit with an electron-attractive group in its principal chain, and 65–93 mol % comprises an aromatic compound unit having a 4'-phenoxybenzophenone-2,5-diyl structure as the aromatic compound unit without an electron-attractive group in its principal chain.

6. A composite polymer electrolyte membrane according to claim 5, wherein the sulfonated polyarylene polymer has an ion exchange capacity of 1.5–3.0 meq/g.

7. A composite polymer electrolyte membrane according to claim 2, wherein the first polymer electrolyte comprises a sulfonated polyarylene polymer whereof 3–60 mol % comprises an aromatic compound unit having at least one structure wherein the aromatic compounds are ether-bonded as the aromatic compound unit with an electron-attractive group in its principal chain, and 40–97 mol % comprises an aromatic compound unit without an electron-attractive group in its principal chain.

8. A composite polymer electrolyte membrane according to claim 7, wherein the first polymer electrolyte comprises a sulfonated polyarylene polymer whereof 3–60 mol % comprises an aromatic compound unit having a bis(benzoyl)diphenylether-4,4'-diyl structure as the aromatic compound unit with an electron-attractive group in its principal chain, and 40–97 mol % comprises an aromatic compound unit having a 4'-phenoxy-benzophenone-2,5-diyl structure as the aromatic compound unit without an electron-attractive group in its principal chain.

9. A composite polymer electrolyte membrane according to claim 8, wherein the sulfonated polyarylene polymer has an ion exchange capacity of 1.5–3.0 meq/g.

10. A composite polymer electrolyte membrane according to claim 1, wherein the second polymer electrolyte comprises a sulfonated polyether or sulfonated polysulfide polymer electrolyte.

11. A composite polymer electrolyte membrane according to claim 10, wherein the second polymer electrolyte comprises one or more polymer electrolytes selected from among sulfonated polyphenylene oxides, sulfonated polyether ether ketones and sulfonated polyphenylene sulfides.

12. A solid polymer electrolyte fuel cell equipped with a membrane electrode assembly wherein a pair of electrodes and an electrolyte membrane between the two electrodes are combined so as to form a single entity, wherein:
    the electrolyte membrane comprises a composite polymer electrolyte membrane comprising a mixture of at least two types of polymer electrolyte including a first polymer electrolyte and a second polymer electrolyte, the first polymer electrolyte comprising a sulfonated polyarylene polymer and constituting 50–95 wt % of the electrolyte membrane, and the second polymer electrolyte comprises a hydrocarbon polymer electrolyte other than the sulfonated polyarylene polymer which is the first polymer electrolyte, wherein the first polymer electrolyte and the second polymer electrolyte have different skeleton structures from each other, and
    the first polymer electrolyte comprises a sulfonated polyarylene polymer comprising an aromatic compound repeating unit with an electron-attractive group in the principal chain thereof and an aromatic compound repeating unit without an electron-attractive group in the principal chain thereof.

* * * * *